US012142227B2

(12) United States Patent
Kim et al.

(10) Patent No.: US 12,142,227 B2
(45) Date of Patent: Nov. 12, 2024

(54) DISPLAY DEVICE, CONTROLLER, AND DISPLAY DRIVING METHOD

(71) Applicant: LG Display Co., Ltd., Seoul (KR)

(72) Inventors: Juwon Kim, Gyeonggi-do (KR); MooKyoung Hong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 269 days.

(21) Appl. No.: 17/364,669

(22) Filed: Jun. 30, 2021

(65) Prior Publication Data

US 2022/0157257 A1 May 19, 2022

(30) Foreign Application Priority Data

Nov. 17, 2020 (KR) ........................ 10-2020-0154065

(51) Int. Cl.
*G09G 3/3275* (2016.01)
*G09G 3/32* (2016.01)
*G09G 3/3266* (2016.01)

(52) U.S. Cl.
CPC ............. *G09G 3/3275* (2013.01); *G09G 3/32* (2013.01); *G09G 3/3266* (2013.01); *G09G 2300/0842* (2013.01); *G09G 2310/0251* (2013.01); *G09G 2320/0233* (2013.01); *G09G 2320/0242* (2013.01); *G09G 2320/0613* (2013.01); *G09G 2320/10* (2013.01); *G09G 2330/021* (2013.01)

(58) Field of Classification Search
CPC .......... G09G 3/20; G09G 3/36; G09G 3/3607; G09G 3/3275; G09G 3/32; G09G 3/3266; G09G 2330/021
See application file for complete search history.

(56) References Cited

U.S. PATENT DOCUMENTS

| | | | | |
|---|---|---|---|---|
| 2020/0166646 | A1* | 5/2020 | Van Der Sijde | G06T 5/50 |
| 2020/0265791 | A1* | 8/2020 | Gao | G09G 3/3696 |
| 2020/0312256 | A1* | 10/2020 | Lin | G09G 3/3607 |
| 2021/0407370 | A1* | 12/2021 | Yang | G09G 3/006 |

FOREIGN PATENT DOCUMENTS

| | | |
|---|---|---|
| KR | 20170072994 A | 6/2017 |
| KR | 20190058878 A | 5/2019 |

* cited by examiner

*Primary Examiner* — Michael A Faragalla
(74) *Attorney, Agent, or Firm* — Seed IP Law Group LLP

(57) ABSTRACT

The present disclosure relates to display devices, controllers, and display driving methods, and more specifically, to a display device, a controller, and a display driving method capable of selectively overdriving only a pattern of an image or sub-pixel regarded as a more likely lack of charge. Through this, there is provided an effect of preventing excessive compensation due to unnecessary overdriving.

16 Claims, 20 Drawing Sheets

DISPLAY DEVICE, CONTROLLER, AND DISPLAY DRIVING METHOD

CROSS-REFERENCE TO RELATED APPLICATION

This application claims the priority benefit of Republic of Korea Patent Application No. 10-2020-0154065, filed on Nov. 17, 2020 in the Korean Intellectual Property Office, the disclosure of which is incorporated herein by reference in its entirety.

BACKGROUND

Technical Field

The present disclosure relates to display devices, controllers, and display driving methods.

Description of the Related Art

As the advent of information society, there have been growing needs for display devices for displaying images. To meet such needs, recently, various types of display devices, such as a Liquid Crystal Display (LCD) device, an Electroluminescence Display (ELD) device including a Quantum-dot Light Emitting Display device, and an Organic Light Emitting Display (e.g., OLED) device, and the like, have been developed and widely used.

Generally, display devices charges a capacitor disposed in each of a plurality of sub-pixels arranged on a display panel and use the charged capacitance for display driving.

BRIEF SUMMARY

However, in such typical display devices in the related art, the capacitor in each sub-pixel may suffer from insufficient charging, and thereby, image quality may become poor. In particular, the inventors of the present disclosure have recognized that as the size of the panel increases, the delay of corresponding data signals and gate signals becomes longer, and in turn, the amount of charge stored in the capacitor may become more insufficient. To address such an issue, embodiments of the present disclosure provide display devices, controllers, and display driving methods for compensating for a lack of the amount of charge in sub-pixels.

Embodiments of the present disclosure provide display devices, controllers, and display driving methods for selectively overdriving only an image pattern or a sub-pixel regarded as a more likely lack of charge.

Embodiments of the present disclosure provide display devices, controllers, and display driving methods for preventing excessive compensation caused by unnecessary overdriving by selectively performing overdriving for an image pattern regarded as a more likely lack of charge and not performing the overdriving for an image pattern regarded as a less likely lack of charge.

Embodiments of the present disclosure provide display devices, controllers, and display driving methods for preventing excessive compensation caused by unnecessary overdriving by selectively performing overdriving for one or more sub-pixels disposed in a location regarded as a more likely lack of charge and not performing the overdriving for one or more sub-pixels disposed in a location regarded as a less likely lack of charge.

In accordance with aspects of the present disclosure, a display device is provided that includes a display panel including a plurality of sub-pixels connected to a plurality of data lines and a plurality of gate lines, and a data driving circuit outputting a data signal to at least one of the plurality of data lines for displaying an image on the display panel.

The data driving circuit can output either a first data signal or a second data signal as the data signal an overdriven data signal or the data signal not overdriven based on either a pattern of an image or a location of a sub-pixel to which the data signal is supplied. The second data signal can be overdriven compared to the first data signal (hereinafter, "overdriven" means that overdriving for a data signal, data voltage, data, voltage, or the like has been performed).

The data driving circuit can output the data signal not overdriven when the image pattern is a monochromatic still image pattern displayed with data voltages equal to or greater than a threshold data voltage value.

The data driving circuit can output the first data signal not overdriven when the image pattern is a pattern in which a voltage level of the data signal for displaying the image does not swing, The overdriven second data signal may include a voltage duration or level in which an overdriving voltage is added to an original data voltage. The overdriving voltage may vary depending on the image pattern or may vary according to a location of the sub-pixel to which an original data voltage is supplied.

When the plurality of sub-pixels includes a first sub-pixel and a second sub-pixel, and the first sub-pixel is located closer to the data driving circuit than the second sub-pixel, the first sub-pixel may receive the first data signal, and the second sub-pixel may receive the second data signal.

When the plurality of sub-pixels further includes a third sub-pixel, and the third sub-pixel is located farther away from the data driving circuit than the second sub-pixel, the third sub-pixel may receive a third data signal.

The second data signal supplied to the second sub-pixel may include a voltage duration or level in which a second overdriving voltage is added to an original data voltage. The third data signal supplied to the third sub-pixel may include a voltage duration or level in which a third overdriving voltage is added to an original data voltage.

The third overdriving voltage may be greater than the second overdriving voltage.

The display device according to aspects of the present disclosure may include a register storing information on a pattern of an image for which the first data signal is output or storing information on a pattern of an image for which the second data signal is output.

The display device according to aspects of the present disclosure may further include a controller that controls the data driving circuit and supplies data to the data driving circuit, and a power management integrated circuit that outputs a source driving voltage, which is an operation voltage of the data driving circuit, to the data driving circuit.

The display device according to aspects of the present disclosure may further include a feedback line for feeding back the source driving voltage supplied to the data driving circuit to the controller.

The controller can determine whether a pattern of an image to be displayed on the display panel is a pattern regarded as a more likely lack of charge (e.g., "charge lack pattern") that is defined in advance based on the fed-back source driving voltage, and output information on whether overdriving is beneficial (or in some cases required) or an overdriving level according to a result of the determination.

The controller can determine whether a pattern of an image to be displayed on the display panel is a charge lack pattern defined in advance based on a monitoring result for a current resulting from an output of the source driving voltage from the power management integrated circuit, and output information on whether overdriving is beneficial (or in some cases required) or an overdriving level according to a result of the determination.

The display device according to aspects of the present disclosure may further include a controller power block for supplying a current to the controller, and a current sensor for sensing a current supplied to the controller from the controller power block.

The controller can determine whether a pattern of an image to be displayed on the display panel is a charge lack pattern defined in advance based on a result of the sensing of the current sensor, and output information on whether overdriving is beneficial (or in some cases, required) or an overdriving level according to a result of the determination.

In accordance with aspects of the present disclosure, a controller is provided that includes a data supply circuit for supplying data for an image displayed on a display panel, and a selective pixel overdriving controller outputting a control signal for controlling whether overdriving is performed, or causing either a first data or a second data to be output according to a pattern of the image or a location of a sub-pixel to which the data are supplied. The second data can be overdriven compared to the first data.

The selective pixel overdriving controller can output a control signal for causing the overdriving not to be performed or cause the first data to be output when the image pattern is a monochromatic still image pattern displayed with data voltages equal to or greater than a threshold data voltage value.

The selective pixel overdriving controller can output a control signal for causing the overdriving not to be performed or cause the first data to be output when the image pattern is a pattern in which a voltage level of a data signal for displaying the image does not swing.

In accordance with aspects of the present disclosure, a display driving method of a display device is provided that includes determining whether a pattern of an image to be displayed on an associated display panel is a charge lack pattern defined in advance, outputting an overdriven data signal when it is determined that the image pattern is the charge lack pattern, and outputting a not-overdriven data signal when it is determined that the image pattern is not the charge lack pattern.

In accordance with aspects of the present disclosure, a display driving method of a display device is provided that includes identifying a location of a sub-pixel of a plurality of sub-pixels to which data are supplied, and outputting either a first data signal or a second data signal according to the identified location of the sub-pixel. The second data signal can be overdriven compared to the first data signal According to embodiments of the present disclosure, it is possible to provide display devices, controllers, and display driving methods capable of compensating for a lack of the amount of charge in sub-pixels.

According to embodiments of the present disclosure, it is possible to provide display devices, controllers, and display driving methods capable of selectively overdriving only an image pattern or a sub-pixel regarded as a more likely lack of charge.

According to embodiments of the present disclosure, it is possible to provide display devices, controllers, and display driving methods capable of preventing excessive compensation caused by unnecessary overdriving by selectively performing overdriving for an image pattern regarded as a more likely lack of charge and not performing the overdriving for an image pattern regarded as a less likely lack of charge.

According to embodiments of the present disclosure, it is possible to provide display devices, controllers, and display driving methods capable of preventing excessive compensation caused by unnecessary overdriving by selectively performing overdriving for one or more sub-pixels disposed in a location regarded as a more likely lack of charge and not performing the overdriving for one or more sub-pixels disposed in a location regarded as a less likely lack of charge.

BRIEF DESCRIPTION OF THE SEVERAL VIEWS OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
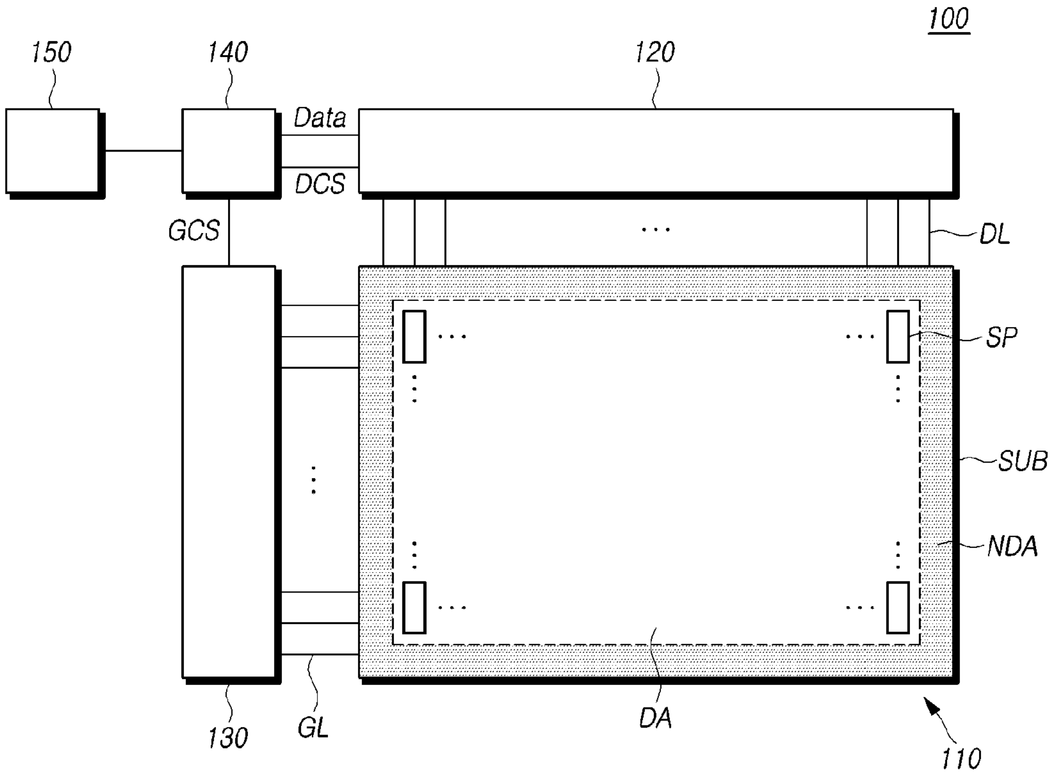
FIG. 1 illustrates a system configuration of a display device according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a system configuration of a display device 100 according to aspects of the present disclosure.

Referring to FIG. 1, the display device 100 according to aspects of the present disclosure includes a display panel 110 and a driving circuit for driving the display panel 110.

The driving circuit may include a data driving circuit 120 and a gate driving circuit 130, and may further include a controller 140 that controls the data driving circuit 120 and the gate driving circuit 130.

The display panel 110 may include a substrate SUB, and signal lines such as a plurality of data lines DL, a plurality of gate lines GL, and the like disposed over the substrate SUB. The display panel 110 may include a plurality of sub-pixels SP connected to the plurality of gate lines GL and the plurality of data lines DL.

The display panel 110 may include a display area DA in which an image is displayed and a non-display area NDA in which an image is not displayed. In the display panel 110, the plurality of sub-pixels SP for displaying an image may be disposed in the display area DA, and the driving circuits 120, 130, and 140 may be electrically connected to, or mounted one in, the non-display area NDA. A pad portion in which an integrated circuit or a printed circuit is connected may be disposed in the non-display area NDA of the display panel 110.

The data driving circuit 120 is a circuit for driving the plurality of data lines DL, and can supply data signals to the plurality of data lines DL. The gate driving circuit 130 is a circuit for driving the plurality of gate lines GL, and can supply gate signals to the plurality of gate lines GL. The controller 140 can supply a data control signal DCS to the data driving circuit 120 in order to control an operation timing of the data driving circuit 120. The controller 140 can supply a gate control signal GCS to the gate driving circuit 130 in order to control an operation timing of the gate driving circuit 130.

The controller 140 may include any electrical circuitry, features, components, an assembly of electronic components or the like. That is, the controller 140 may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "controller." The controller 140 starts a scanning operation according to timings scheduled in each frame, converts image data inputted from other devices or other image providing sources to a data signal type used in the data driving circuit 120 and then supplies image data DATA resulting from the converting to the data driving circuit 120, and controls the loading of the data to at least one pixel at a pre-configured time according to a scan signal.

The controller 140 can receive, in addition to input image data, several types of timing signals including a vertical synchronous signal VSYNC, a horizontal synchronous signal HSYNC, an input data enable signal DE, a clock signal CLK, and the like from other devices, networks, or systems (e.g., a host system 150).

In order to control the data driving circuit 120 and the gate driving circuit 130, the controller 140 can receive one or more of the timing signals such as the vertical synchronization signal VSYNC, the horizontal synchronization signal HSYNC, the input data enable signal DE, the clock signal CLK, and the like, generate several types of control signals DCS and GCS, and output the generated signals to the data driving circuit 120 and the gate driving circuit 130.

For example, in order to control the gate driving circuit 130, the controller 140 can output several types of gate control signals GCS including a gate start pulse GSP, a gate shift clock GSC, a gate output enable signal GOE, and the like.

Further, to control the data driving circuit 120, the controller 140 can output several types of data control signals DCS including a source start pulse SSP, a source sampling clock SSC, a source output enable (SOE) signal, and the like.

The controller 140 may be implemented in a separate component from the data driving circuit 120, or integrated with the data driving circuit 120 and implemented into an integrated circuit.

The data driving circuit 120 can drive a plurality of data lines DL by receiving image data Data from the controller 140 and supplying data signals to the plurality of data lines DL. Here, the data driving circuit 120 may also be referred to as a source driving circuit.

The data driving circuit 120 may be implemented by including one or more source driver integrated circuits SDIC.

Each source driver integrated circuit SDIC may include a shift register, a latch circuit, a digital-to-analog converter DAC, an output buffer, and the like. In some instances, each source driver integrated circuit SDIC may further include one or more analog to digital converters ADC.

In some embodiments, each source driving circuit SDIC may be connected to the display panel 110 in a tape automated bonding (TAB) type, or connected to a conductive pad such as a bonding pad of the display panel 110 in a chip on glass (COG) type or a chip on panel (COP) type, or connected to the display panel 110 in a chip on film (COF) type.

The gate driving circuit 130 can output gate signals of a turn-on level voltage or gate signals of a turn-off level voltage according to the control of the controller 140. The gate driving circuit 130 can sequentially drive a plurality of gate lines GL by sequentially supplying the gate signals of the turn-on level voltage to the plurality of gate lines GL.

In some embodiments, the gate driving circuit 130 may be connected to the display panel 110 in the tape automated bonding (TAB) type, or connected to a conductive pad such as a bonding pad of the display panel 110 in the chip on glass (COG) type or the chip on panel (COP) type, or connected to the display panel 110 in the chip on film (COF) type. In another embodiment, the gate driving circuit 130 may be located in the non-display area NDA of the display panel 110 in a gate in panel (GIP) type. The gate driving circuit 130 may be disposed on or over a substrate SUB, or connected to the substrate SUB. That is, in the case of the GIP type, the gate driving circuit 130 may be disposed in the non-display area NDA of the substrate SUB. The gate driving circuit 130 may be connected to the substrate SUB in the case of the chip on glass (COG) type, the chip on film (COF) type, or the like.

When a specific gate line is asserted by a scan signal from the gate driving circuit 130, the data driving circuit 120 can convert image data DATA received from the controller 140 into data signals in the form of analog signal and supplies the resulted data signals to a plurality of data lines DL.

The data driving circuit 120 may be located on, but not limited to, only one side (e.g., an upper side or a lower side) of the display panel 110. In some embodiments, the data driving circuit 120 may be located on, but not limited to, two sides (e.g., an upper side and a lower side) of the panel 110 or at least two of four sides of the panel 110 according to driving schemes, panel design schemes, or the like.

The gate driving circuit 130 may be located on, but not limited to, only one side (e.g., a left side or a right side) of the display panel 110. In some embodiments, the gate driving circuit 130 may be located on, but not limited to, two sides (e.g., a left side and a right side) of the panel 110 or at least two of four sides of the panel 110 according to driving schemes, panel design schemes, or the like.

The controller 140 may be a timing controller used in the typical display technology or a control apparatus/device capable of additionally performing other control functionalities in addition to the typical function of the timing controller. In some embodiments, the controller 140 may be one or more other control circuits different from the timing controller, or a circuit or component in the control apparatus/device. The controller 140 may be implemented with various circuits or electronic components such as an integrated circuit (IC), a field programmable gate array (FPGA), an application specific integrated circuit (ASIC), a processor, and/or the like.

The controller 140 may be mounted on a printed circuit board, a flexible printed circuit, or the like, and may be electrically connected to the data driving circuit 120 and the gate driving circuit 130 through the printed circuit board, the flexible printed circuit, or the like.

The controller 140 may transmit and receive signals to and from the data driving circuit 120 via one or more predetermined or selected interfaces. In some embodiments, such interfaces may include a low voltage differential signaling (LVDS) interface, an EPI interface, a serial peripheral interface (SPI), and the like.

The controller 140 may include a storage medium such as one or more registers.

The display device 100 according to aspects of the present disclosure may be a display including a backlight unit such as a liquid crystal display device, or may be a self-emissive display such as an organic light emitting diode (OLED) display, a quantum dot (QD) display, a micro light emitting diode (M-LED) display, and the like.

In case the display device 100 according to aspects of the present disclosure is the OLED display, each sub-pixel SP may include an OLED where the OLED itself emits light as a light emitting element. In case the display device 100 according to aspects of the present disclosure is the QD display, each sub-pixel SP may include a light emitting element including a quantum dot, which is a self-emissive semiconductor crystal. In case the display device 100 according to aspects of the present disclosure is the micro LED display, each sub-pixel SP may include a micro LED where the micro OLED itself emits light and which is based on an inorganic material as a light emitting element.

Figure 2A:
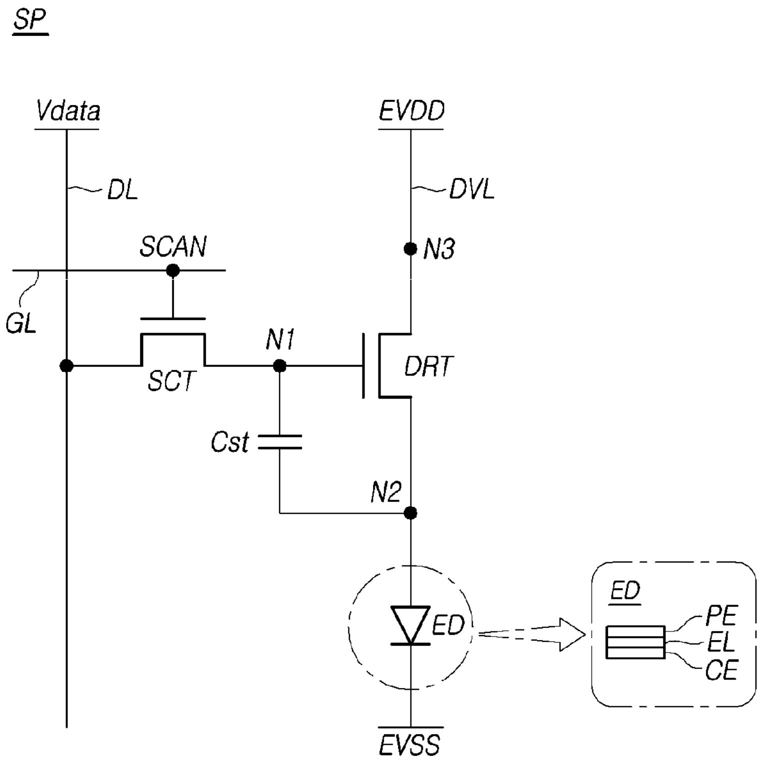
FIGS. 2A and 2B illustrate equivalent circuits for one or more sub-pixels in the display device according to aspects of the present disclosure.
Figure 2B:
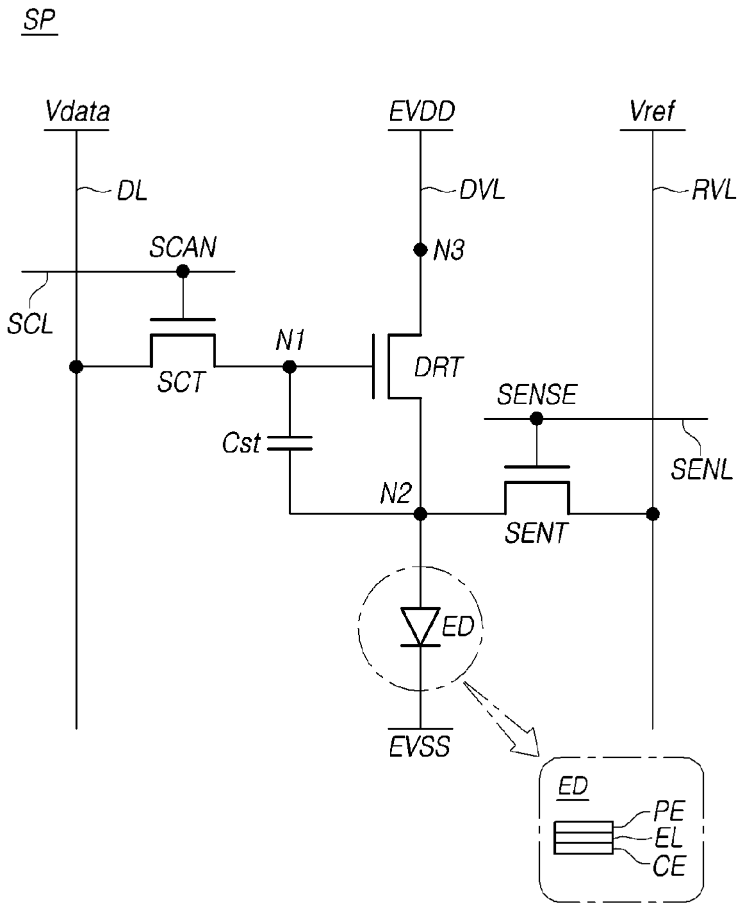

FIGS. 2A and 2B illustrate equivalent circuits for one or more sub-pixels SP in the display device 100 according to aspects of the present disclosure.

Referring to FIG. 2A, each of a plurality of sub-pixels SP disposed in the display panel 110 of the display device 100 according to aspects of the present disclosure may include a light emitting element ED, a driving transistor DRT, and a scan transistor SCT and a storage capacitor Cst.

Referring to FIG. 2A, the light emitting element ED may include a pixel electrode PE and a common electrode CE and an emission layer EL located between the pixel electrode PE and the common electrode CE.

The pixel electrode PE of the light emitting element ED may be an electrode disposed in each sub-pixel SP, and the common electrode CE may be an electrode commonly disposed in all sub-pixels SP. Here, the pixel electrode PE may be an anode electrode and the common electrode CE may be a cathode electrode. In another embodiment, the pixel electrode PE may be the anode electrode and the common electrode CE may be the cathode electrode.

In an embodiment, the light emitting element ED may be an organic light emitting diode (OLED), a light emitting diode (LED), a quantum dot light emitting element or the like.

The driving transistor DRT may be a transistor for driving the light emitting element ED, and may include a first node N1, a second node N2, a third node N3, and the like.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT. The second node N2 may be also electrically connected to a source node or a drain node of a sensing transistor SENT, and connected to the pixel electrode PE of the light emitting element ED. The third node N3 of the driving transistor DRT may be electrically connected to a driving voltage line DVL for supplying a driving voltage EVDD.

The scan transistor SCT can be controlled by a scan signal SCAN, which is a type of gate signal, and may be connected between the first node N1 of the driving transistor DRT and a data line DL. In other words, the scan transistor SCT can be turned on or off according to the scan signal SCAN supplied through a scan signal line SCL, which is a type of the gate line GL, and control an electrical connection between the data line DL and the first node N1 of the driving transistor DRT.

The scan transistor SCT can be turned on by a scan signal SCAN having a turn-on level voltage, and passes a data signal Vdata supplied through the data line DL to the first node of the driving transistor DRT.

In an embodiment, when the scan transistor SCT is an n-type transistor, the turn-on level voltage of the scan signal SCAN may be a high level voltage. In another embodiment, when the scan transistor SCT is a p-type transistor, the turn-on level voltage of the scan signal SCAN may be a low level voltage.

The storage capacitor Cst may be connected between the first node N1 and the second node N2 of the driving transistor DRT. The storage capacitor Cst can charge the amount of charge corresponding to a voltage difference between both terminals and maintain the voltage difference between both terminals for a predetermined or selected frame time. Accordingly, during the predetermined or selected frame time, a corresponding sub-pixel SP can emit light.

Referring to FIG. 2B, each of the plurality of sub-pixels SP disposed in the display panel 110 of the display device 100 according to aspects of the present disclosure may further include a sensing transistor SENT.

The sensing transistor SENT can be controlled by a sense signal SENSE, which is a type of gate signal, and may be connected between the second node N2 of the driving transistor DRT and a reference voltage line RVL. In other words, the sensing transistor SENT can be turned on or off according to the sense signal SENSE supplied through a sense signal line SENL, which is another type of the gate line GL, and control an electrical connection between the reference voltage line RVL and the second node N2 of the driving transistor DRT.

The sensing transistor SENT can be turned on by a sense signal SENSE having a turn-on level voltage, and pass a reference voltage Vref transmitted through the reference voltage line RVL to the second node of the driving transistor DRT.

The sensing transistor SENT can be turned on by the sense signal SENSE having the turn-on level voltage, and transmit a voltage at the second node N2 of the driving transistor DRT to the reference voltage line RVL.

In an embodiment, when the sensing transistor SENT is an n-type transistor, the turn-on level voltage of the sense signal SENSE may be a high level voltage. In another embodiment, when the sensing transistor SENT is a p-type transistor, the turn-on level voltage of the sense signal SENSE may be a low level voltage.

The function of the sensing transistor SENT transmitting the voltage at the second node N2 of the driving transistor DRT to the reference voltage line RVL may be used when driven to sense a characteristic value of the sub-pixel SP. In this case, the voltage transmitted to the reference voltage line RVL may be a voltage for calculating the characteristic value of the sub-pixel SP or a voltage in which the characteristic value of the sub-pixel SP is reflected.

Herein, the characteristic value of the sub-pixel SP may be a characteristic value of the driving transistor DRT or the light emitting element ED. The characteristic value of the driving transistor DRT may include a threshold voltage and/or mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. Herein, for convenience of description, it is assumed that each of the driving transistor DRT, the scan transistor SCT, and the sensing transistor SENT is the n-type transistor.

The storage capacitor Cst may be an external capacitor intentionally designed to be located outside of the driving transistor DRT, other than an internal capacitor, such as a parasitic capacitor (e.g., a Cgs, a Cgd), that may be formed between the gate node and the source node (or drain node) of the driving transistor DRT.

The scan signal line SCL and the sense signal line SENL may be different gate lines GL. In some embodiments, the scan signal SCAN and the sense signal SENSE may be separate gate signals, and the on-off timing of the scan transistor SCT and the on-off timing of the sensing transistor SENT in one sub-pixel SP may be independent. That is, the on-off timing of the scan transistor SCT and the on-off timing of the sensing transistor SENT in one sub-pixel SP may be equal to, or different from, each other.

In another embodiment, the scan signal line SCL and the sense signal line SENL may be the same gate line GL. That is, a gate node of the scan transistor SCT and a gate node of the sensing transistor SENT in one sub-pixel SP may be connected to one gate line GL. In some embodiments, the scan signal SCAN and the sense signal SENSE may be the same gate signal, and the on-off timing of the scan transistor SCT and the on-off timing of the sensing transistor SENT in one sub-pixel SP may be the same.

It should be understood that the sub-pixel structures shown in FIGS. 2A and 2B are merely examples of possible sub-pixel structures for convenience of discussion, and embodiments of the present disclosure may be implemented in any of various structures, as desired. For example, the sub-pixel SP may further include at least one transistor and/or at least one capacitor.

Further, discussions on the sub-pixel structures in FIGS. 2A and 2B have been conducted based on the assumption that the display device 100 is a self-emissive display device, and when the display device 100 is a liquid crystal display, each sub-pixel SP may include a transistor, a pixel electrode, and the like.

Figure 3:
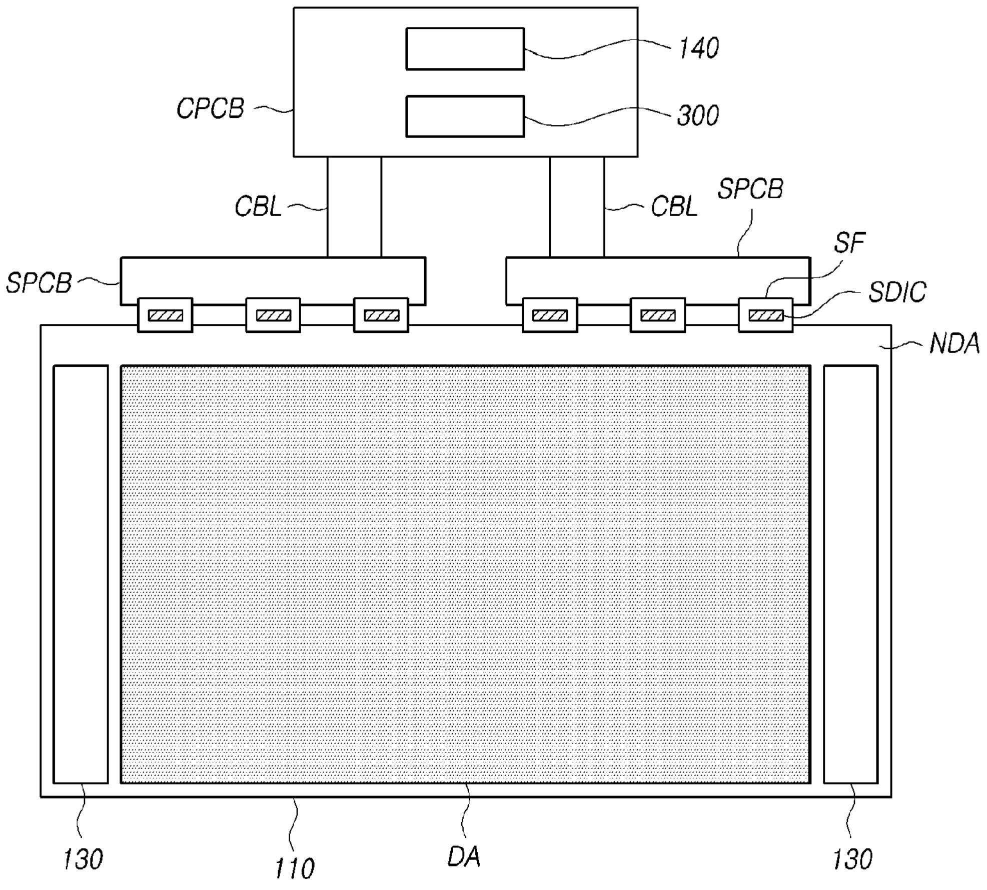
FIG. 3 illustrates an example system implementation of the display device according to aspects of the present disclosure.

FIG. 3 illustrates an example system implementation of the display device 100 according to aspects of the present disclosure.

Referring to FIG. 3, the display panel 110 may include a display area DA in which an image is displayed and a non-display area NDA in which an image is not displayed.

Referring to FIG. 3, when the data driving circuit 120 includes one or more source driver integrated circuits SDIC and is implemented in the chip on film (COF) type, each source driver integrated circuit SDIC may be mounted on a circuit film SF connected to the non-display area NDA of the display panel 110.

Referring to FIG. 3, the gate driving circuit 130 may be implemented in the gate in panel (GIP) type. In this embodiment, the gate driving circuit 130 may be located in the non-display area NDA of the display panel 110. In another embodiment, unlike FIG. 3, the gate driving circuit 130 may be implemented in a chip on film (COF) type.

The display device 100 may include at least one source printed circuit board SPCB for a circuital connection between one or more source driver integrated circuits SDIC and other devices, components, and the like, and a control printed circuit board CPCB on which control components, and various types of electrical devices or components are mounted.

The circuit film SF on which the source driver integrated circuit SDIC is mounted may be connected to at least one source printed circuit board SPCB. That is, one side of the circuit film SF on which the source driver integrated circuit SDIC is mounted may be electrically connected to the display panel 110 and the other side thereof may be electrically connected to the source printed circuit board SPCB.

The controller 140 and the power management integrated circuit PMIC, 300 may be mounted on the control printed circuit board CPCB. The controller 140 can perform an overall control function related to the driving of the display panel 110 and control operations of the data driving circuit 120 and the gate driving circuit 130. The power management integrated circuit 300 can supply various types of voltages or currents to the data driving circuit 120 and the gate driving circuit 130 or control various types of voltages or currents to be supplied.

A circuital connection between the at least one source printed circuit board SPCB and the control printed circuit board CPCB may be performed through at least one connection cable CBL. The connection cable CBL may be, for example, a flexible printed circuit FPC, a flexible flat cable FFC, or the like.

The at least one source printed circuit board SPCB and the control printed circuit board CPCB may be integrated and implemented into one printed circuit board.

The display device 100 according to aspects of the present disclosure may further include a level shifter for adjusting a voltage level. In an embodiment, the level shifter may be disposed on the control printed circuit board CPCB or the source printed circuit board SPCB. In the display device 100 according to aspects of the present disclosure, the level shifter can supply signals beneficial (or in some cases, required) for gate driving to the gate driving circuit 130. In an embodiment, the level shifter can supply a plurality of clock signals to the gate driving circuit 130. Accordingly, the gate driving circuit 130 can supply a plurality of gate signals to a plurality of gate lines GL based on the plurality of clock signals input from the level shifter. The plurality of gate lines GL can carry the gate signals to the sub-pixels SP disposed in the display area DA of the substrate SUB.

Meanwhile, when a data signal Vdata is supplied to a sub-pixel SP for displaying an image on the display panel 110 of the display device 100, charging across the storage capacitor Cst in the sub-pixel SP can be performed by the data signal Vdata. In this situation, when the amount of charge (or a charging rate) of the storage capacitor Cst in the sub-pixel SP is not as high as the amount of charge (or a charging rate) needed for normal image display, a partial color difference may occur, and as a result, image quality may become greatly poor.

As a size of the display panel 110 increases, the delay of the data signal Vdata and the gate signals SCAN and SENSE may be longer, and accordingly, the amount of charge in the sub-pixel SP may become more insufficient.

Hereinafter, discussions will be conducted on examples of a lack of charge of a storage capacitor Cst in a sub-pixel SP with reference to FIGS. 4A and 4B, and then, discussions will be conducted on methods for improving a charging rate of the storage capacitor Cst in the sub-pixel SP with reference to FIG. 5. In the following, for convenience of description, the charging of the storage capacitor Cst in the sub-pixel SP may be expressed as the charging of the sub-pixel SP.

Figure 4A:
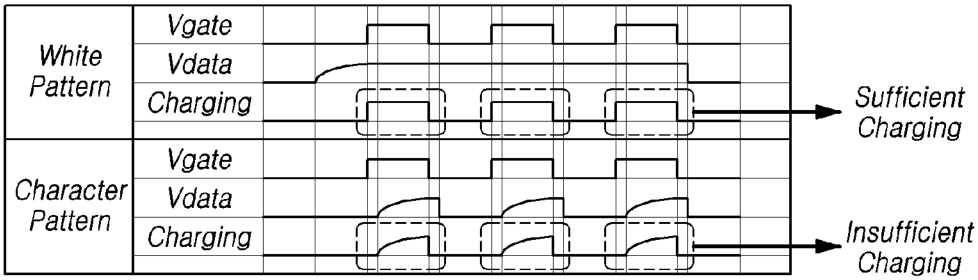
FIG. 4A illustrates charging situations in two image patterns displayed on a display panel of the display device according to aspects of the present disclosure.

FIG. 4A illustrates charging situations of two image patterns (a white pattern and a character pattern) displayed on the display panel 110 of the display device 100 according to aspects of the present disclosure.

FIG. 4A illustrates comparison between respective charging situations in a sub-pixel SP when image patterns to be displayed on the display panel 110 follow the white pattern and the character pattern.

The white pattern may be an example of an image pattern in which a data signal Vdata applied to each data line DL for displaying an image does not swing. Further, the white pattern may be an example of a high-luminance monochromatic still image pattern. Here, the "high-luminance image" may mean an image displayed with data voltages equal to or greater than a threshold data voltage value. The threshold data voltage value is a preset value, and can be reconfigured to be increased or decreased on a certain scale in order to adjust the accuracy of control.

The character pattern may be an example of an image pattern in which a data signal Vdata applied to each data line DL for displaying an image swings.

Referring to FIG. 4A, when a gate signal Vgate is sequentially supplied to each of the gate lines GL, in order to display an image of the white pattern, a data signal Vdata having a constant voltage level not swinging over time may be supplied to each data line DL.

In this manner, since the data signal Vdata having the constant voltage level not swinging over time is supplied to each data line DL, in order to display the image of the white pattern, in the case of a sub-pixel SP to which the data signal Vdata having the constant voltage level not swinging over time is supplied, a charging time may not be insufficient, that is, sufficient charging may be performed.

However, referring to FIG. 4A, when a gate signal Vgate is sequentially supplied to each of the gate lines GL, in order to display an image of the character pattern, a data signal Vdata having a voltage level swinging over time may be supplied to each data line DL.

In this situation, since the data signal Vdata having the voltage level swinging over time is supplied to each data line DL, in order to display the image of the character pattern, in the case of a sub-pixel SP to which the data signal Vdata having the voltage level swinging over time is supplied, a charging time may become insufficient. As a result, when the image of the character pattern is displayed on the display panel 110, image quality may become poor due to such insufficient charging.

Accordingly, in order to compensate for a lack of charge in a corresponding sub-pixel SP when an image to be displayed on the display panel 110 corresponds to the character pattern, the data driving circuit 130 of the display device 100 according to aspects of the present disclosure can supply an overdriven data signal Vdata to which overdriving has been applied to the sub-pixels SP according to the control of the controller 140. This technique is referred to as a pixel over driving (or pixel overdriving) (POD) algorithm. Hereinafter, the pixel overdriving (POD) algorithm will be described again with reference to FIG. 5.

Figure 4B:
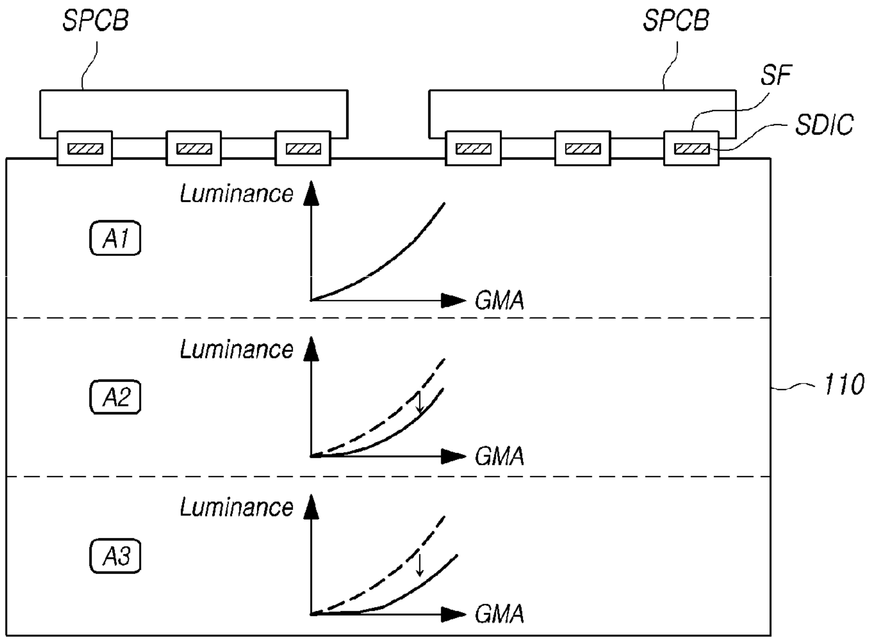
FIG. 4B illustrates charging situations in each area of the display panel of the display device according to aspects of the present disclosure.

FIG. 4B illustrates charging situations in each area of the display panel 110 of the display device 100 according to aspects of the present disclosure.

Referring to FIG. 4B, a plurality of sub-pixels SP disposed on the display panel 110 may have different distances from the source driver integrated circuits SDIC included in the data driving circuit 120.

For example, when the display panel 110 is divided into a first area A1, a second area A2, and a third area A3, the first area A1 among the first to third areas (A1, A2, and A3) may be an area closest to the source driver integrated circuits SDIC or the source printed circuit board SPCB connected thereto, and the third area A3 among the first to third areas (A1, A2, and A3) may be an area farthest away from the source driver integrated circuits SDIC or the source printed circuit board SPCB connected thereto.

Referring to FIG. 4B, the plurality of sub-pixels SP may include a first sub-pixel SP disposed in the first area A1, a second sub-pixel SP disposed in the second area A2, and a third sub-pixel SP disposed in the area A3.

Accordingly, among the first sub-pixel SP disposed in the first area A1, the second sub-pixel SP disposed in the second area A2, and the third sub-pixel SP disposed in the third area A3, the sub-pixel SP disposed in the first area A1 is located closest to the source driver integrated circuits SDIC.

Among the first sub-pixel SP disposed in the first area A1, the second sub-pixel SP disposed in the second area A2, and the third sub-pixel SP disposed in the third area A3, the sub-pixel SP disposed in the third area A3 is located farthest away from the source driver integrated circuits SDIC.

Accordingly, a length of a path through which data signals Vdata output from the source driver integrated circuit SDIC are transmitted to sub-pixels SP disposed in the first area A1 is the shortest. Further, a length of a path through which data signals Vdata output from the source driver integrated circuit SDIC are transmitted to sub-pixels SP disposed in the third area A3 is the longest.

When the data signals Vdata output from the source driver integrated circuit SDIC are supplied to the sub-pixels SP disposed in the first area A1, due to the relative short transmission path of the data signal Vdata, as the data signals Vdata are relatively rapidly supplied to the sub-pixels SP disposed in the first area A1, a charging time of the sub-pixels SP disposed in the first area A1 may not be insufficient.

In contrast, when the data signals Vdata output from the source driver integrated circuit SDIC are supplied to the sub-pixels SP disposed in the second area A2, due to the relative long transmission path of the data signal Vdata, as the data signals Vdata are relatively slowly supplied to the sub-pixels SP disposed in the second area A2, a charging time of the sub-pixels SP disposed in the second area A2 may become insufficient.

Further, when the data signals Vdata output from the source driver integrated circuit SDIC are supplied to the sub-pixels SP disposed in the third area A3, due to the longest transmission path of the data signal Vdata, as the data signals Vdata are most slowly supplied to the sub-pixels SP disposed in the third area A3, a charging time of the sub-pixels SP disposed in the third area A3 may become most insufficient.

As described above, in the case of the sub-pixels SP disposed in the first area A1 located closest to the source driver integrated circuit SDIC, normal luminance corresponding to a voltage signal from a gamma circuitry (not shown) can be represented because a lack of charge may not occur.

In contrast, in the case of the sub-pixels SP disposed in the second area A2, which is located farther away from the source driver integrated circuit SDIC than the first area A1, as a lack of charge may occur to some extent, normal luminance corresponding to a voltage signal from a gamma circuitry may not be represented, and thus, there may occur a decrease in luminance corresponding to the lack of the amount of charge in the sub-pixels SP.

Further, in the case of the sub-pixels SP disposed in the third area A3, which is located farthest away from the source driver integrated circuit SDIC, as a lack of charge may occur to a greater extent, normal luminance corresponding to a voltage signal from the gamma circuitry may not be represented, and thus, there may occur a large decrease in luminance corresponding to the large lack of the amount of charge in the sub-pixels SP.

Figure 5:
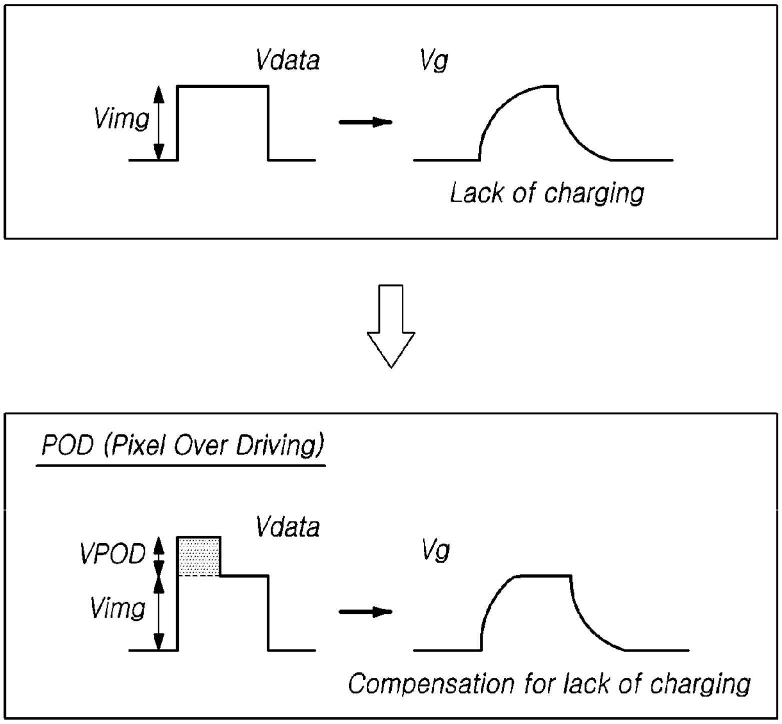
FIG. 5 illustrates pixel overdriving of the display device according to aspects of the present disclosure.

FIG. 5 illustrates pixel overdriving (or pixel over driving) of the display device 100 according to aspects of the present disclosure.

Referring to FIG. 5, before the pixel overdriving algorithm is applied, a data signal Vdata supplied to a sub-pixel SP has an image voltage Vimg for displaying an image (representing a selected gray level).

When such a data signal Vdata is output to a corresponding data line DL, a voltage (Vg, a voltage at the first node N1 in FIG. 2A or FIG. 2B) at one of both ends of a storage capacitor Cst in the sub-pixel SP connected to the data line DL may not rapidly vary at a rate corresponding to a voltage level transition of the corresponding data signal Vdata. Accordingly, the charging of the storage capacitor Cst in the sub-pixel SP may become insufficient.

However, if the pixel overdriving algorithm is applied, a data signal Vdata output to the corresponding data line DL may include a voltage duration or level in which an overdriving voltage VPOD is added to an image voltage Vimg for image display (representing a selected gray level).

Thus, when such an overdriven data signal Vdata is supplied to the sub-pixel SP through the corresponding data line DL, a voltage (Vg, a voltage at the first node N1 in FIG. 2A or FIG. 2B) at one of both ends of the storage capacitor Cst in the sub-pixel SP can rapidly vary at the rate corresponding to the voltage level transition of the corresponding data signal Vdata. Accordingly, the insufficient charging of the storage capacitor Cst in the sub-pixel SP can be compensated. That is, the charging of the storage capacitor Cst in the sub-pixel SP may become sufficient to the extent that image display can be normally performed.

Figure 6A:
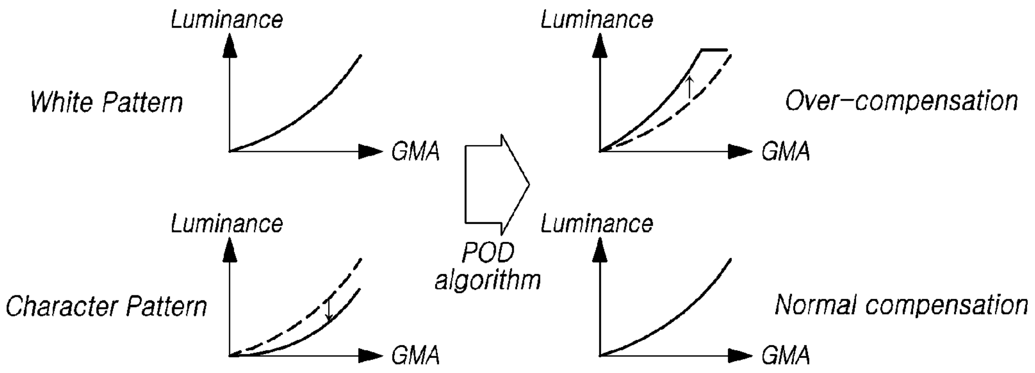
FIG. 6A illustrates situations of normal compensation and over-compensation that may occur in each image pattern when the pixel overdriving is performed in the display device according to aspects of the present disclosure.

FIG. 6A illustrates situations of normal compensation and over-compensation that may occur in each image pattern when the pixel overdriving POD is performed in the display device 100 according to aspects of the present disclosure.

Referring to FIG. 6A, before the pixel overdriving algorithm is applied, an image following an image pattern (e.g., the white pattern, etc.) in which a lack of charge may not occur may have normal luminance corresponding to a voltage signal from the gamma circuitry. In contrast, an image following an image pattern (e.g., the character pattern) in which a lack of charge may occur may not have normal luminance corresponding to a voltage signal from the gamma circuitry, and a decrease in luminance corresponding to the lack of the amount of charge may occur.

Referring to FIG. 6A, if the pixel overdriving algorithm is applied regardless of types of image patterns, an image following the image pattern (e.g., the character pattern, etc.) in which a lack of charge may occur can be compensated for the lack of charge by overdriving, and as a consequence, normal luminance can be represented. That is, normal compensation can be performed for the image following the image pattern (e.g., the character pattern, etc.) in which a lack of charge may occur, and as a consequence, image quality can be improved.

In contrast, if the pixel overdriving algorithm is applied regardless of types of image patterns, an image following the image pattern (e.g., the white pattern, etc.) in which a lack of charge may not occur may rather represent luminance higher than the normal luminance due to the overdriving in spite of being able to represent normal luminance. That is, over-compensation can be performed by unnecessary (excessive) overdriving for the image following the image pattern (e.g., the white pattern, etc.) in which a lack of charge may not occur, and as a consequence, corresponding image quality may become rather poor.

When such an over-compensation occurs, the degradation of a light emitting element ED or a driving transistor DRT of a sub-pixel SP may become accelerated, and as a consequence, image quality may become deteriorated considerably.

In other words, if the pixel overdriving algorithm is applied equally regardless of types of image patterns, the quality of images following the image pattern (e.g., the white pattern, etc.) in which a lack of charge may not occur may become rather poor, that is, adversely affected.

Meanwhile, if the pixel overdriving algorithm is applied equally regardless of a location of the sub-pixel SP, a side effect of rather causing image quality to be gone down may occur in a specific area. Discussions on this are conducted with reference to FIG. 6B.

Figure 6B:
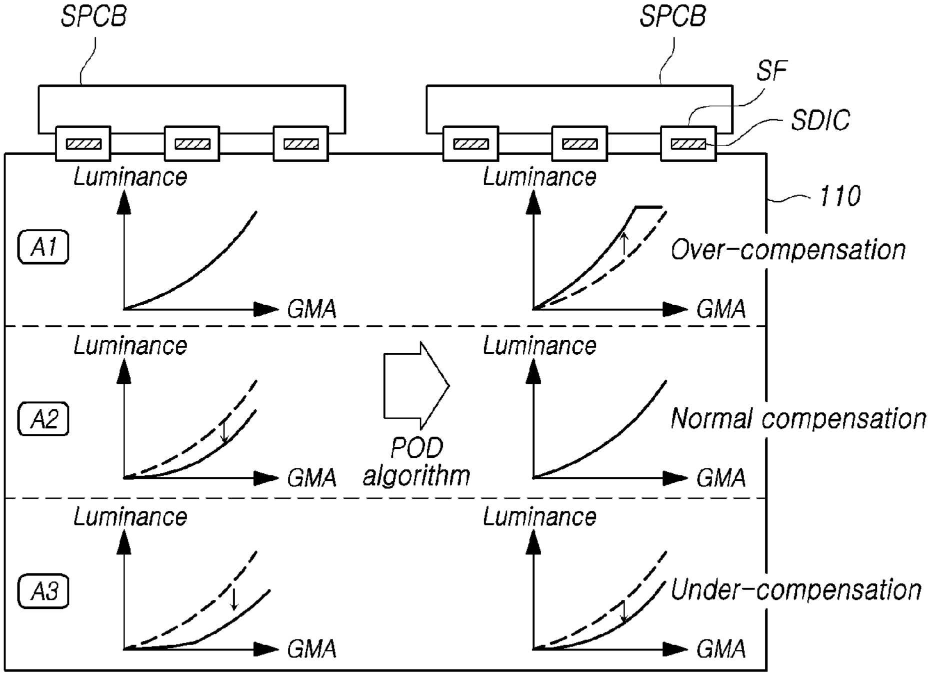
FIG. 6B illustrates situations of normal compensation, over-compensation, and under-compensation that may occur in each area when the pixel overdriving is performed in the display device according to aspects of the present disclosure.

FIG. 6B illustrates situations of normal compensation, over-compensation, and under-compensation that may occur in each area when the pixel overdriving POD is performed in the display device 100 according to aspects of the present disclosure.

Referring to FIG. 6B, before the pixel overdriving algorithm is applied, sub-pixels SP disposed in a first area A1, which is located closest to the source driver integrated circuit SDIC or the source printed circuit board SPCB connected to the source driver integrated circuit SDIC, among first to third areas A1 to A3, may not have a lack of charge, and can therefore represent normal luminance corresponding to a voltage signal from the gamma circuitry. In contrast, sub-pixels SP disposed in second and third areas A2 and A3, which are spaced farther away than the first area A1 from the source driver integrated circuit SDIC or the source printed circuit board SPCB connected to the source driver integrated circuit SDIC, among first to third areas A1 to A3, may not represent normal luminance corresponding to voltage signals from the gamma circuitry due to lacks of charge, and as a consequence, decreases in luminance corresponding to the lacks of the amount of charge may occur.

Referring to FIG. 6B, if the pixel overdriving algorithm is applied regardless of locations of the sub-pixels, the sub-pixels SP disposed in the second area A2 in which a lack of charge may occur can be compensated for the lack of charge by overdriving, and as a consequence, normal luminance can be represented. That is, normal compensation can be performed for the sub-pixels SP disposed in the second area A2 in which a lack of charge may occur, and as a consequence, image quality can be improved.

In contrast, if the pixel overdriving algorithm is applied regardless of locations of the sub-pixels, the sub-pixels SP disposed in the first area A1 in which a lack of charge may not occur may rather represent luminance higher than the normal luminance due to the overdriving in spite of being able to represent normal luminance. That is, over-compensation can be performed by unnecessary (excessive) overdriving for the sub-pixels SP disposed in the first area A1 in which a lack of charge may not occur, and as a consequence, corresponding image quality may become rather poor.

Further, when the pixel overdriving algorithm is applied with a degree to which a lack of charge in the second area A2 can be compensated regardless of locations of the sub-pixels SP, the sub-pixels SP disposed in the third area A3 in which a greatest lack of charge may occur may not be completely compensated for a corresponding lack of charge due to an insufficient degree of the overdriving in spite of the application of the overdriving, and as a consequence, may represent luminance lower than the normal luminance. That is, under-compensation, which is insufficient for completely compensating for a corresponding lack of charge, can be performed for the sub-pixels SP disposed in the third area A3 in which the greatest lack of charge may occur, and as a consequence, corresponding image quality may not be improved.

In other words, if the pixel overdriving algorithm is applied equally regardless of locations of the sub-pixels SP, as excessive overdriving is performed for the sub-pixels disposed in the first area A1 located closer to the source driver integrated circuit SDIC, therefore, over-compensation can be performed, and as insufficient overdriving is performed for the sub-pixels SP disposed in the third area A3 located farthest away from the source driver integrated circuit SDIC, therefore, under-compensation can be performed.

Accordingly, according to embodiments of the present disclosure, there is provided a selective pixel overdriving (POD) algorithm for selectively performing overdriving taking account of one or more of image patterns and locations of one or more sub-pixels. Hereinafter, the selective pixel overdriving (POD) algorithm according to embodiments of the present disclosure will be described in greater detail.

Figure 7:
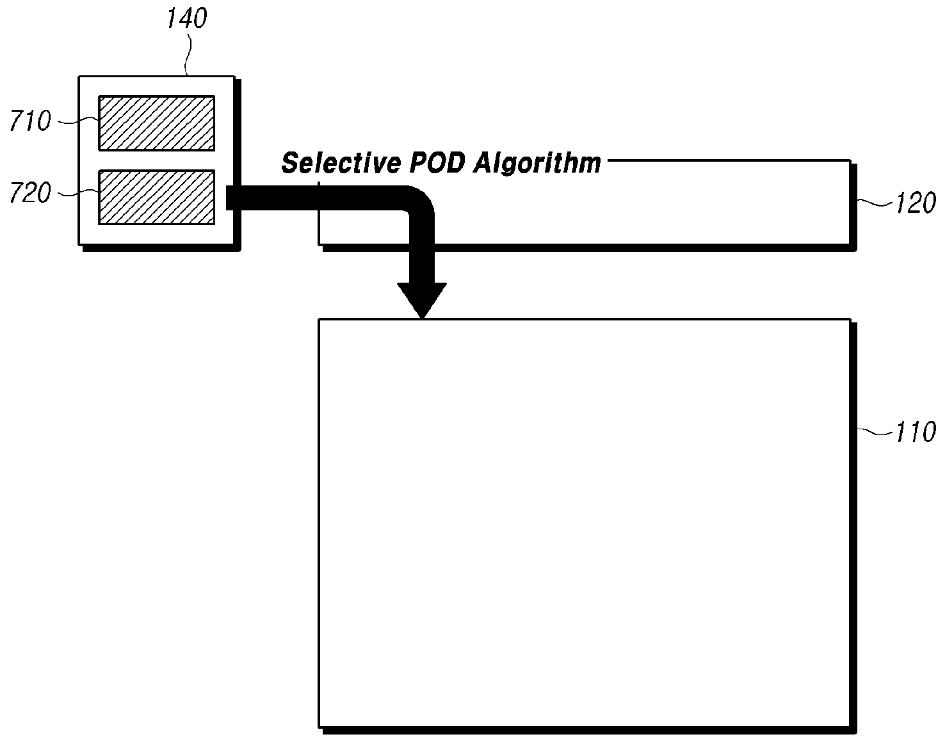
FIG. 7 illustrates selective pixel overdriving POD in the display device according to aspects of the present disclosure.

FIG. 7 illustrates example of the selective pixel overdriving in the display device 100 according to aspects of the present disclosure.

Referring to FIG. 7, the display device 100 according to aspects of the present disclosure includes a display panel including a plurality of sub-pixels SP to which a plurality of data lines DL and a plurality of gate lines GL are connected, a data driving circuit 120 for outputting data signals Vdata to a plurality of data lines DL to display images on the display panel 110, a controller 140 for controlling the data driving circuit 120, and the like.

Referring to FIG. 7, the display device 100 according to aspects of the present disclosure can perform a selective pixel overdriving (POD) algorithm for selectively performing overdriving taking account of one or more of image patterns and locations of the sub-pixels.

To do this, the controller 140 may include a data supply circuit 710 that supplies data (digital data) for images to be displayed on the display panel 110, a selective pixel overdriving controller 720 that controls the selective pixel overdriving algorithm, and the like.

The selective pixel overdriving controller 720 can output a control signal for controlling whether overdriving is performed according to a pattern of an image or a location of a sub-pixel SP to which data are supplied.

In some embodiments, the selective pixel overdriving controller 720 can cause overdriven data to be output or non-overdriven data to be output.

The data driving circuit 120 can output an overdriven data signal Vdata or a data signal Vdata not overdriven (e.g., non-overdriven data signal Vdata) according to a pattern of an image or a location of a sub-pixel SP to which the data signal Vdata is supplied according to the control of the controller 140.

In some embodiments, to apply the selective pixel overdriving algorithm, the controller 140 can pre-define information on image patterns requiring the application of overdriving and image patterns not requiring the application of overdriving, or can identify whether an image to be displayed on the display panel 110 follows the image pattern requiring the application of overdriving or the image pattern not requiring the application of overdriving.

In some embodiments, the controller 140 can store information on locations of sub-pixels requiring the application of overdriving or information on locations of sub-pixels not requiring the application of overdriving in advance.

Figure 8:
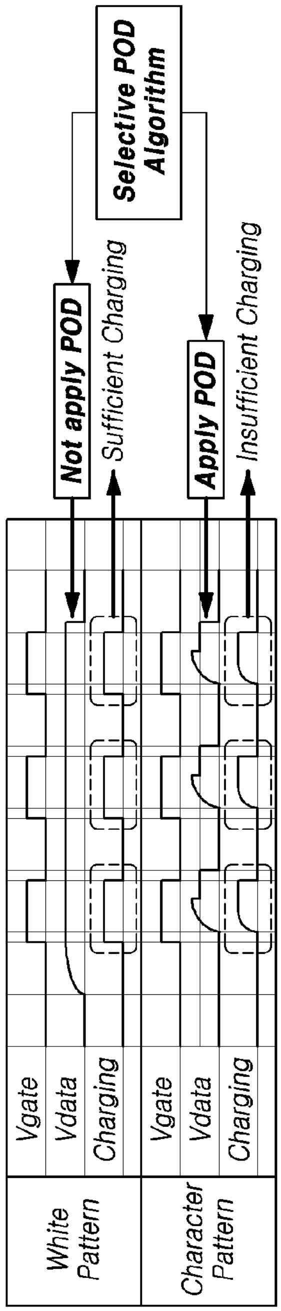
FIG. 8 illustrates an image pattern to which the selective pixel overdriving POD is applied in the display device according to aspects of the present disclosure.

FIG. 8 illustrates an image pattern to which the selective pixel overdriving is applied in the display device 100 according to aspects of the present disclosure.

Referring to FIG. 8, the white pattern may be an example of an image pattern in which a data signal Vdata applied to each data line DL for displaying an image does not swing. Further, the white pattern may be an example of a high-luminance monochromatic still image pattern. In contrast, the character pattern may be an example of an image pattern in which a data signal Vdata applied to each data line DL for displaying an image swings.

Referring to FIG. 8, when an image to be displayed on the display panel 110 is the white pattern, since lacks of charge in the sub-pixels SP are less likely to occur, overdriving may not be applied. In contrast, when an image to be displayed on the display panel 110 is the character pattern, since lacks of charge in the sub-pixels SP are more likely to occur, overdriving may be applied.

For example, discussions on the application of the selective overdriving algorithm in terms of classifying types of image patterns according to whether a data signal Vdata swings are given as follows.

When a pattern of an image to be displayed on the display panel 110 is a pattern (e.g., the white pattern) in which a corresponding data signal Vdata does not swing, since lacks of charge in the sub-pixels SP are less likely to occur, overdriving may not be applied.

When a pattern of an image is a pattern (e.g., the white pattern) in which a corresponding data signal Vdata does not swing, the selective pixel overdriving controller 720 included in the controller 140 can output a control signal for causing overdriving not to be applied or cause non-overdriven data to be output.

Accordingly, when the image pattern is the pattern (e.g., the white pattern) in which the data signal Vdata does not swing, the data driving circuit 120 can output the data signal Vdata not overdriven.

In contrast, when a pattern of an image to be displayed on the display panel 110 is a pattern (e.g., the character pattern) in which a corresponding data signal Vdata swings, since lacks of charge in the sub-pixels SP are more likely to occur, therefore, overdriving may be applied.

When a pattern of an image is a pattern (e.g., the character pattern) in which a corresponding data signal Vdata swings, the selective pixel overdriving controller 720 included in the controller 140 can output a control signal for causing overdriving to be applied or cause overdriven data to be output.

Accordingly, when the image pattern is the pattern (e.g., the character pattern, etc.) in which the data signal Vdata for displaying the image swings, the data driving circuit 120 can output an overdriven data signal Vdata.

In some embodiments, discussions on the application of the selective overdriving algorithm in terms of classifying types of image patterns according to colors and movements of images are given as follows.

When a pattern of an image to be displayed on the display panel 110 is a monochromatic still image pattern having a luminance value greater than or equal to a predetermined or selected luminance value, since lacks of charge in the sub-pixels SP are less likely to occur, therefore, overdriving may not be applied.

That an image has a luminance value equal to or greater than the predetermined or selected luminance value may mean that the image is displayed with data voltages equal to or greater than a threshold data voltage value. The threshold data voltage value is a data voltage value that can represent a predetermined or selected luminance value. The threshold data voltage value is a preset value, and can be reconfigured to be increased or decreased on a certain scale in order to adjust the accuracy of control.

When the image pattern is the monochromatic still image pattern having a luminance value equal to or greater than the predetermined or selected luminance value, that is, the monochromatic still image pattern displayed with data voltages equal to or greater than the threshold data voltage value, the selective pixel overdriving controller 720 included in the controller 140 can output a control signal for causing overdriving not to be applied or cause non-overdriven data to be output.

Accordingly, when the image pattern is the monochromatic still image pattern having a luminance value equal to or greater than the predetermined or selected luminance value, the data driving circuit 120 can output the data signal Vdata not overdriven.

When a pattern of an image to be displayed on the display panel 110 is not a monochromatic still image pattern having a luminance value greater than or equal to a predetermined or selected luminance value (e.g., a multi-color or moving image pattern), since lacks of charge in the sub-pixels SP are more likely to occur, therefore, overdriving may be applied.

When the image pattern is not the monochromatic still image pattern having a luminance value greater than or equal to the predetermined or selected luminance value, the selective pixel overdriving controller 720 included in the controller 140 can output a control signal for causing overdriving to be applied or cause overdriven data to be output.

Accordingly, when the image pattern is not the monochromatic still image pattern having a luminance value equal to or greater than the predetermined or selected luminance value, the data driving circuit 120 can output an overdriven data signal Vdata.

Figure 9:
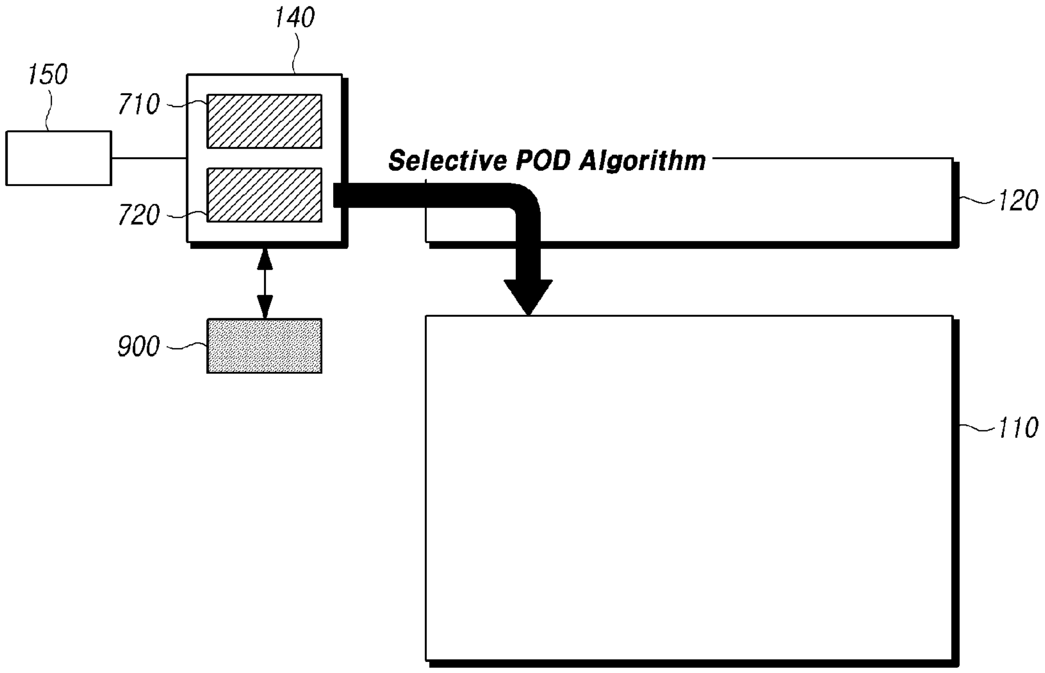
FIG. 9 illustrates register-based selective pixel overdriving in the display device according to aspects of the present disclosure.

FIG. 9 illustrates selective pixel overdriving based on a register 900 in the display device according to aspects of the present disclosure.

Referring to FIG. 9, in order to perform the selective pixel overdriving algorithm, the display device 100 according to aspects of the present disclosure may store information on an image pattern requiring the application of overdriving and an image pattern not requiring the application of overdriving in a register 900 in advance.

In other words, the register 900 can store information on an image pattern for causing a non-overdriven data signal Vdata to be output and an image pattern for causing an overdriven data signal Vdata to be output.

In order to control the selective pixel overdriving, when frame data are input from a host system 150, the selective pixel overdriving controller 720 included in the controller 140 can determine whether an image pattern according to the frame data is an image pattern for causing a non-overdriven data signal Vdata to be output or an image pattern for causing an overdriven data signal Vdata to be output based on the information stored in the register 900.

When overdriving is selectively performed by the selective overdriving algorithm according to embodiments described herein, such an overdriven data signal Vdata is a voltage obtained by adding an overdriving voltage VPOD to an original data voltage Vimg, and the overdriving voltage VPOD may vary according to an image pattern or vary according to a location of a sub-pixel SP to which the original data voltage is supplied.

Hereinafter, to apply the selective pixel overdriving algorithm, discussions are conducted on methods for detecting whether an image to be displayed on the display panel 110 follows an image pattern requiring the application of overdriving or an image pattern not requiring the application of overdriving with reference to FIGS. 10 to 13.

Figure 10:
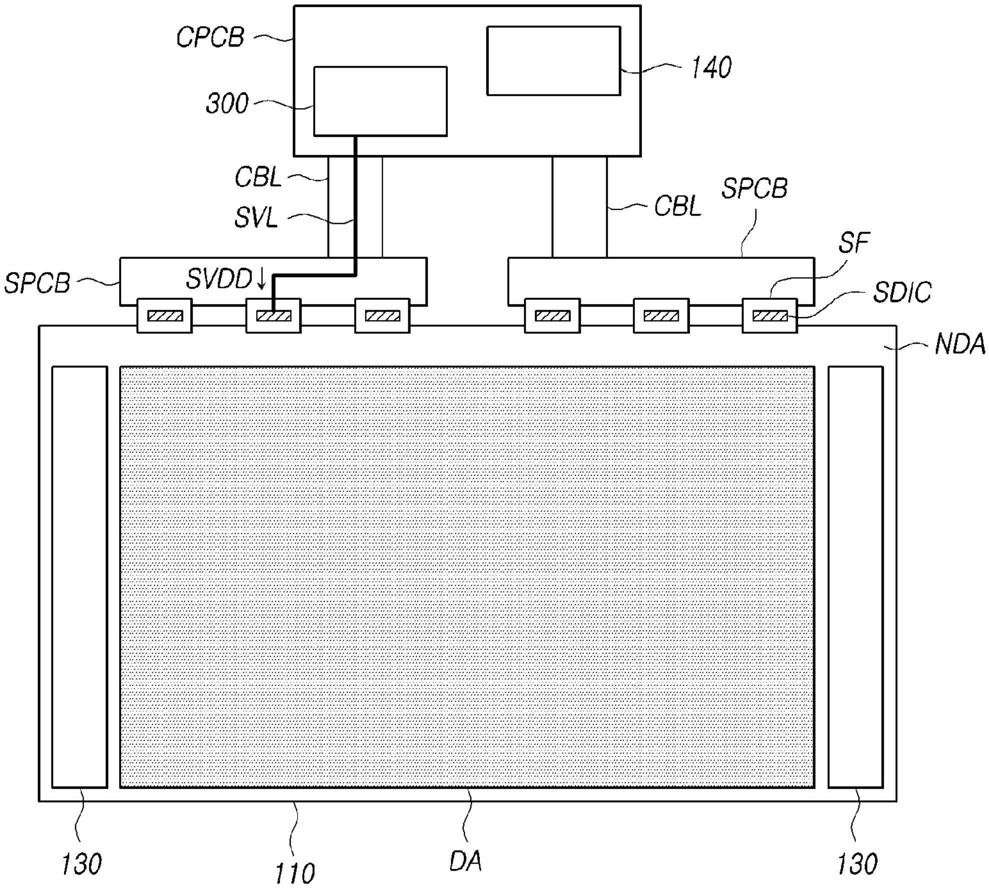
FIG. 10 illustrates a path through which a source driving voltage is supplied in the display device according to aspects of the present disclosure.

FIG. 10 illustrates a path through which a source driving voltage SVDD is supplied in the display device 100 according to aspects of the present disclosure.

Referring to FIG. 10, in order to detect whether an image to be displayed on the display panel 110 follows an image pattern requiring the application of overdriving or an image pattern not requiring the application of overdriving, the display device 100 according to aspects of the present disclosure can use a source driving voltage SVDD supplied from the power management integrated circuit 300 to the source driver integrated circuit SDIC.

Referring to FIG. 10, the display device 100 may include one or more printed circuit boards (SPCB, CPCB), on which various types of circuit components for driving the display panel 110 are mounted, which electrically connect between the electrical components and the display panel 110.

For example, the display device 100 may include a source printed circuit board SPCB related to the source driver integrated circuit SDIC and a control printed circuit board CPCB on which the controller 140 is mounted.

The control printed circuit board CPCB and the source printed circuit board SPCB may be electrically connected through at least one connection cable CBL.

The controller 140 and the power management integrated circuit 300 may be mounted on the control printed circuit board CPCB. The source driver integrated circuit SDIC may be mounted on a circuit film SF that is a flexible printed circuit. One terminal of the circuit film SF may be electrically connected to the non-display area NDA of the display panel 110, and the other terminal of the circuit film SF may be electrically connected to the source printed circuit board SPCB.

Referring to FIG. 10, the power management integrated circuit 300 can supply a source driving voltage SVDD as an internal operation power of the source driver integrated circuit SDIC to the source driver integrated circuit SDIC through a power line SVL. Here, the power line SVL is a line connected between an output pin of the power management integrated circuit 300 and an input pin of the source driver integrated circuit SDIC, and may include a line on the control printed circuit board CPCB, a line on the connection cable CBL, and a line on the source printed circuit board SPCB.

As described above, when a voltage level of a data signal Vdata swings (toggles), a lack of charge may occur in a sub-pixel SP to which the data signal Vdata is supplied.

When the voltage level of the data signal Vdata swings (toggles), as the source driver integrated circuit 120 is beneficial to perform frequent driving operations by the source driving voltage SVDD, therefore, a current corresponding to the source driving voltage SVDD may increase, and a large voltage drop may be caused. This situation may be utilized when detecting an image pattern that may cause a lack of charge.

Figure 11:
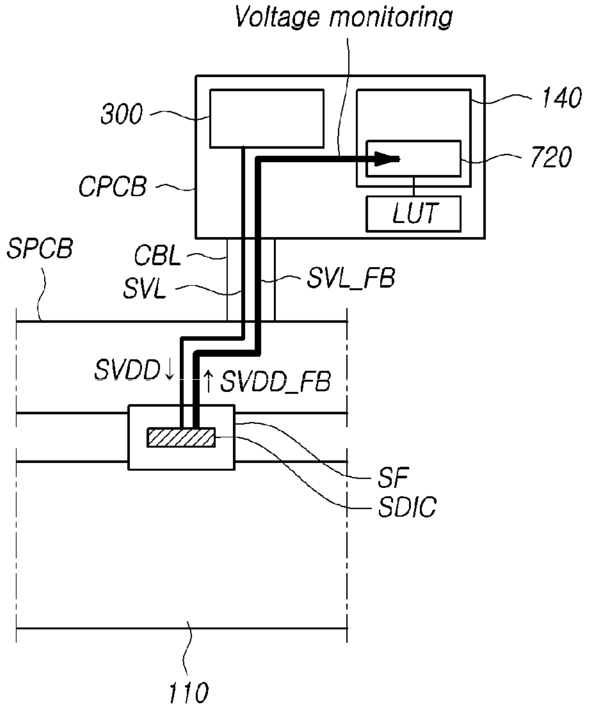
FIG. 11 illustrates a method of sensing an image pattern in an embodiment in the display device according to aspects of the present disclosure.
Figure 12:
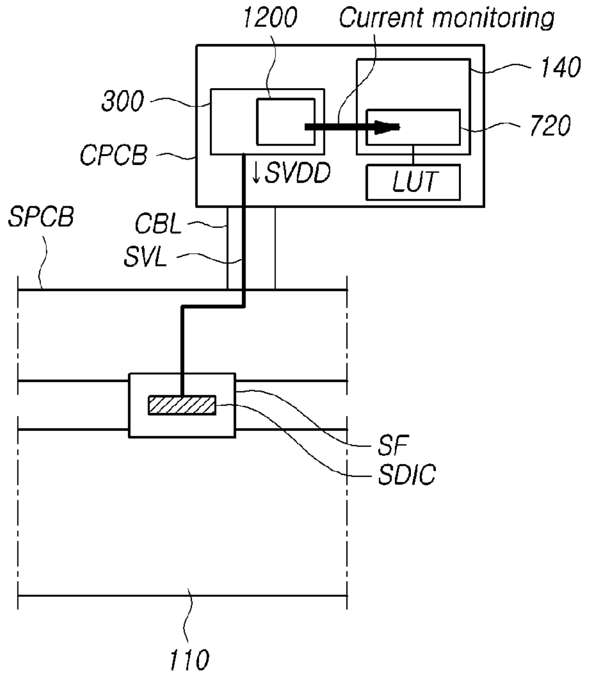
FIG. 12 illustrates a method of sensing an image pattern in another embodiment in the display device according to aspects of the present disclosure.
Figure 13:
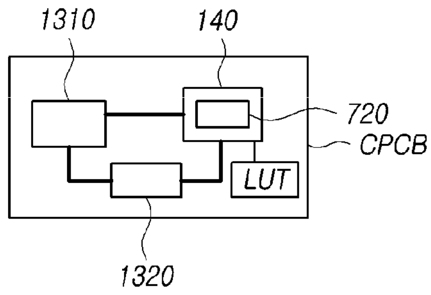
FIG. 13 illustrates a method of sensing an image pattern in further another embodiment in the display device according to aspects of the present disclosure.

FIGS. 11 to 13 illustrate methods of sensing image patterns in some embodiments in the display device 100 according to aspects of the present disclosure. FIGS. 11 to 13 illustrate parts of the system implementation shown in FIG. 10.

FIG. 11 illustrates a voltage monitoring-based method for sensing image patterns in the display device 100 according to aspects of the present disclosure.

Referring to FIG. 11, the controller 140 can control the data driving circuit 120 and supply data to the data driving circuit 120. The power management integrated circuit 300 can output a source driving voltage SVDD, which is an operation voltage of the data driving circuit 120, to the data driving circuit 120 through the power line SVL.

Referring to FIG. 11, the display device 100 according to aspects of present disclosure may further include a feedback line SVL_FB that feeds back the source driving voltage SVDD supplied to the data driving circuit 120 to the controller 140.

The feedback line SVL_FB may be electrically connected between the source driver integrated circuit SDIC and the controller 140. For example, the feedback line SVL_FB may be electrically connected between an input pin through which the source driving voltage SVDD is input to the source driver integrated circuit SDIC and an external input pin of the controller 140.

Based on the source driving voltage SVDD_FB fed back through the feedback line SVL_FB, the selective pixel overdriving controller 720 of the controller 140 can determine whether a pattern of an image to be displayed on the display panel 110 is a predefined charge lack pattern, and according to a result of the determination, output information on whether overdriving is beneficial (or in some cases required) or information on an overdriving level.

For example, the selective pixel overdriving controller 720 of the controller 140 can identify whether overdriving is beneficial (or in some cases required) or information on an overdriving level by comparing the source driving voltage SVDD_FB fed back through the feedback line SVL_FB with the source driving voltage SVDD supplied by the power management integrated circuit 300.

When it is determined that the source driving voltage SVDD_FB fed back through the feedback line SVL_FB is lower than the source driving voltage SVDD supplied by the power management integrated circuit 300 (that is, when it is identified that a voltage drop has occurred), the selective pixel overdriving controller 720 of the controller 140 can determine that an image displayed on the display panel 110 follows a pattern in which the voltage level of a data voltage Vdata swings (e.g., the charge lack pattern).

In this situation, the selective pixel overdriving controller 720 of the controller 140 can cause the overdriving to be performed. The selective pixel overdriving controller 720 of the controller 140 can store information on the identified image pattern in a look-up table LUT as image pattern information requiring the application of overdriving.

Here, the look-up table LUT may be the register 900 of FIG. 9.

When it is determined that the source driving voltage SVDD_FB fed back through the feedback line SVL_FB is equal to the source driving voltage SVDD supplied by the power management integrated circuit 300, or a difference between the source driving voltage SVDD_FB and the source driving voltage SVDD is within a predetermined or selected range, (that is, when it is identified that no voltage drop has occurred or the voltage drop has occurred to a slight extent), the selective pixel overdriving controller 720 of the controller 140 can determine that an image displayed on the display panel 110 follows a pattern in which the voltage level of a data voltage Vdata does not swing (e.g., a pattern that does not follow the charge lack pattern).

In this situation, the selective pixel overdriving controller 720 of the controller 140 can cause the overdriving not to be performed. The selective pixel overdriving controller 720 of the controller 140 can store information on the identified image pattern in the look-up table LUT as image pattern information not requiring the application of overdriving.

Meanwhile, when it is determined that the source driving voltage SVDD_FB fed back through the feedback line SVL_FB is lower than the source driving voltage SVDD supplied by the power management integrated circuit 300 (that is, when it is identified that a voltage drop has occurred), the selective pixel overdriving controller 720 of the controller 140 can calculate a voltage drop value, control an overdriving intensity based on the calculated voltage drop value, and perform adaptive overdriving.

For example, when a large voltage drop has occurred and a large voltage drop value is calculated, the selective pixel overdriving controller 720 of the controller 140 can set an overdriving voltage VPOD to a high value and cause the overdriving intensity to be greater.

When a small voltage drop has occurred and a small voltage drop value is calculated, the selective pixel overdriving controller 720 of the controller 140 can set the overdriving voltage VPOD to a low value and cause the overdriving intensity to be smaller.

FIG. 12 illustrates a method based on internal current monitoring of the power management integrated circuit 300 as one of methods of sensing image patterns in the display device 100 according to aspects of the present disclosure.

Referring to FIG. 12, the selective pixel overdriving controller 720 of the controller 140 can determine whether an image pattern displayed on the display panel 110 is a predefined charge lack pattern based on a result obtained by monitoring a current according to an output of a source driving voltage SVDD from the power management integrated circuit 300, and output information on whether overdriving is beneficial (or in some cases required) or an overdriving level according to a result of the determination.

In more detail, when the power management integrated circuit 300 supplies the source driving voltage SVDD to the source driver integrated circuit SDIC through the power line SVL, the power management integrated circuit 300 may include an internal current monitoring circuit 1200 for monitoring a current flowing through the power line SVL.

The power management integrated circuit 300 can supply a current monitoring result from the internal current monitoring circuit 1200 to the controller 140.

Accordingly, when it is determined that the amount of current increases based on the current monitoring result received from the power management integrated circuit 300, the selective pixel overdriving controller 720 of the controller 140 can determine that an image pattern displayed on the display panel 110 is a predefined charge lack pattern.

In this situation, the selective pixel overdriving controller 720 of the controller 140 can cause the overdriving to be performed. The selective pixel overdriving controller 720 of the controller 140 can store information on the identified image pattern in a look-up table LUT as image pattern information requiring the application of overdriving.

When it is determined that there is no change in the amount of current, or a change in the amount of current is within a predetermined or selected level, based on the current monitoring result received from the power management integrated circuit 300, the selective pixel overdriving controller 720 of the controller 140 can determine that an image pattern displayed on the display panel 110 is not a predefined charge lack pattern.

In this situation, the selective pixel overdriving controller 720 of the controller 140 can cause the overdriving not to be performed. The selective pixel overdriving controller 720 of the controller 140 can store information on the identified image pattern in the look-up table LUT as image pattern information not requiring the application of overdriving.

Meanwhile, based on the current monitoring result received from the power management integrated circuit 300, the selective pixel overdriving controller 720 of the controller 140 can perform adaptive overdriving for causing an overdriving intensity to be greater by setting an overdriving voltage VPOD to a higher value as the degree of change in the amount of current increases, and causing the overdriving intensity to be smaller by setting the overdriving voltage VPOD to a lower value as the degree of change in the amount of current decreases.

FIG. 13 illustrates another method of sensing an image pattern in the display device 100 according to aspects of the present disclosure.

Referring to FIG. 13, the display device 100 may further include a controller power block 1310 that supplies a current to the controller 140 and a current sensor 1320 that senses a current supplied from the controller power block 1310 to the controller 140.

When an image pattern is a pattern (e.g., the character pattern, etc.) in which the voltage level of a data voltage Vdat swings, the amount of calculation of the controller 140 may increase. When the amount of calculation of the controller 140 increases, the controller power block 1310 can supply more current to the controller 140.

When an image pattern is a pattern (e.g., the white pattern, etc.) in which the voltage level of a data voltage Vdata does not swing, the amount of calculation of the controller 140 may be not large. When the amount of calculation of the controller 140 is not large, the controller power block 1310 is not beneficial (or in some cases required) to supply more current to the controller 140.

Accordingly, the current sensor 1320 can sense the current supplied from the controller power block 1310 to the controller 140 and supplies the current sensing result to the controller 140.

Based on the current sensing result of the current sensor 1320, the selective pixel overdriving controller 720 of the controller 140 can determine whether a pattern of an image to be displayed on the display panel 110 is a predefined charge lack pattern, and output information on whether overdriving is beneficial (or in some cases required) or information on an overdriving level according to a result of the determination.

More specifically, when it is determined that the amount of current increases based on the current sensing result of the current sensor 1320, the selective pixel overdriving controller 720 of the controller 140 can determine that the pattern of the image to be displayed on the display panel 110 is a predefined charge lack pattern (e.g., a pattern in which the voltage level of a data voltage Vdata swings.

In this situation, the selective pixel overdriving controller 720 of the controller 140 can cause the overdriving to be performed. The selective pixel overdriving controller 720 of the controller 140 can store information on the identified image pattern in a look-up table LUT as image pattern information requiring the application of overdriving.

When it is determined that the amount of current does not increase or increase in the amount of current is within a predetermined or selected level based on the current sensing result of the current sensor 1320, the selective pixel overdriving controller 720 of the controller 140 can determine that the pattern of the image to be displayed on the display panel 110 is not a predefined charge lack pattern (e.g., a pattern in which the voltage level of a data voltage Vdata does not swing.

In this situation, the selective pixel overdriving controller 720 of the controller 140 can cause the overdriving not to be performed. The selective pixel overdriving controller 720 of the controller 140 can store information on the identified image pattern in the look-up table LUT as image pattern information not requiring the application of overdriving.

Meanwhile, based on the current sensing result of the current sensor 1320, the selective pixel overdriving controller 720 of the controller 140 can perform the adaptive overdriving for causing an overdriving intensity to be greater by setting an overdriving voltage VPOD to a higher value as the degree of change in the amount of current increases, and causing the overdriving intensity to be smaller by setting the overdriving voltage VPOD to a lower value as the degree of change in the amount of current decreases.

Referring to FIG. 13, the controller power block 1310 and the current sensor 1320 may be placed outside of the power management integrated circuit 300, and at least one of the controller power block 1310 and the current sensor 1320 may be implemented as an internal element of the management integrated circuit 300.

Figure 14:
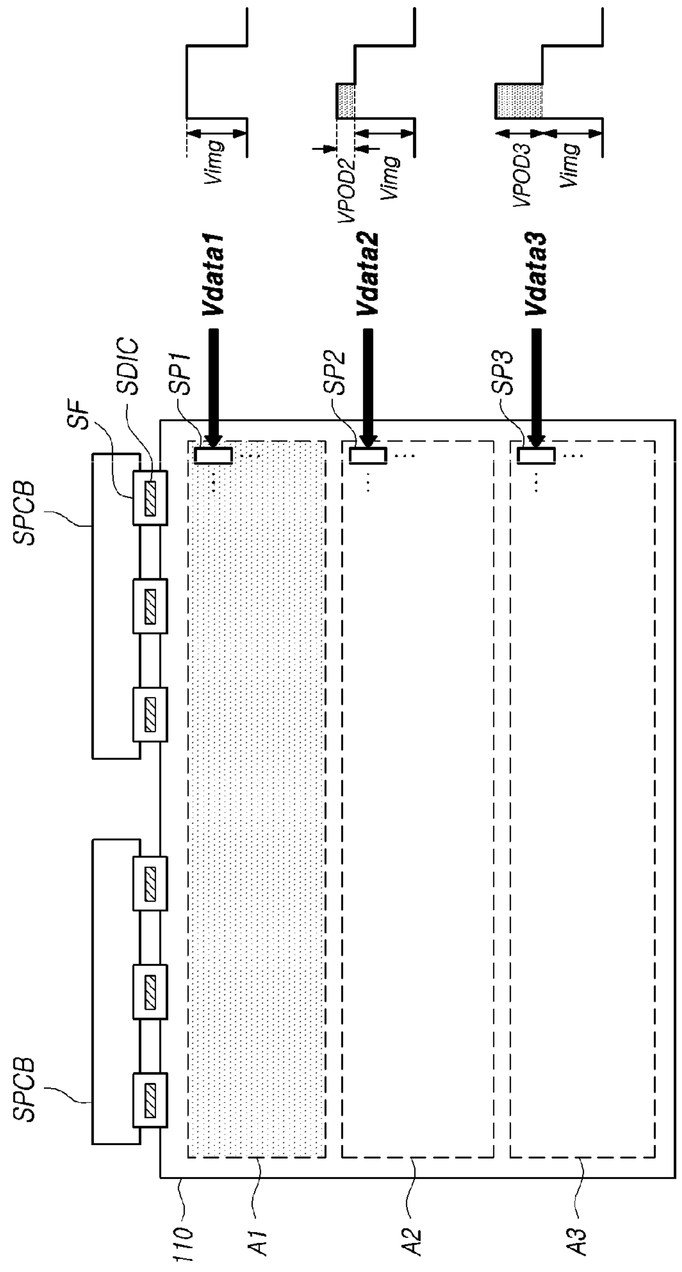
FIGS. 14 and 15 illustrate selective pixel overdriving in each area in the display device according to aspects of the present disclosure.
Figure 15:
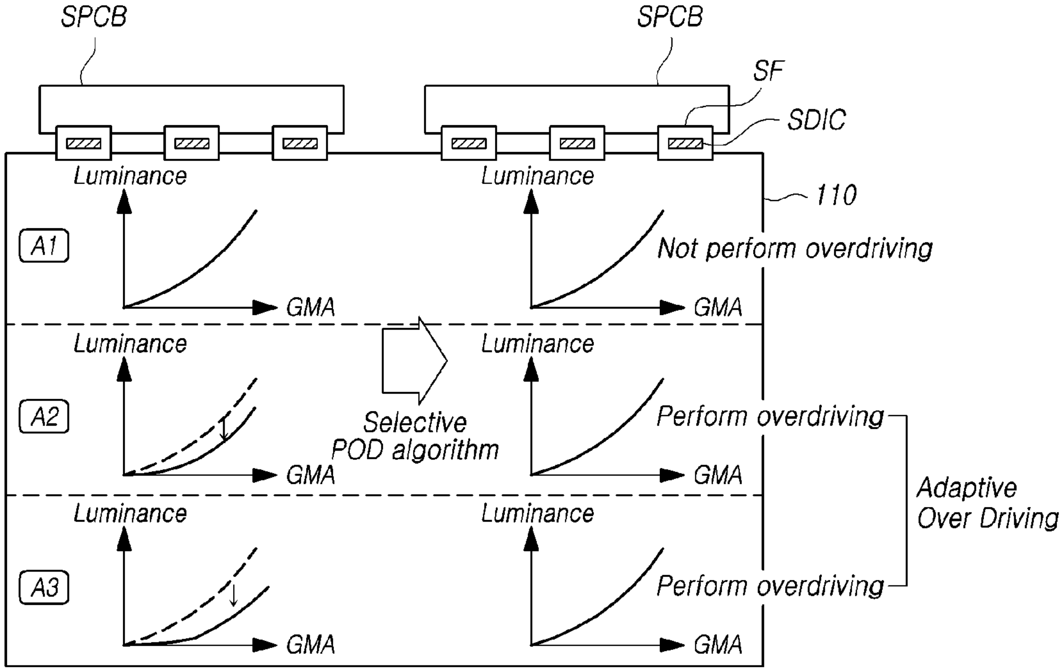

FIGS. 14 and 15 illustrate selective pixel overdriving in each area in the display device 100 according to aspects of the present disclosure.

Referring to FIG. 14, a plurality of sub-pixels SP disposed on the display panel 110 may have different distances from the source driver integrated circuits SDIC included in the data driving circuit 120.

When the display panel 110 is divided into a first area A1, a second area A2, and a third area A3, the first area A1 among the first to third areas (A1, A2, and A3) may be an area closest to the source driver integrated circuits SDIC or the source printed circuit board SPCB connected thereto, and the third area A3 among the first to third areas (A1, A2, and A3) may be an area farthest away from the source driver integrated circuits SDIC or the source printed circuit board SPCB connected thereto.

Referring to FIG. 14, the plurality of sub-pixels SP may include a first sub-pixel SP disposed in the first area A1, a second sub-pixel SP disposed in the second area A2, and a third sub-pixel SP disposed in the area A3.

Accordingly, among the first to third sub-pixels SP1 to SP3, the first sub-pixel SP1 disposed in the first area A1 is located closest to the source driver integrated circuits SDIC. That is, among the first to third sub-pixels SP3, the first sub-pixel SP1 disposed in the first area A1 is located closer to a data driving circuit 120 compared to the second sub-pixel SP2 disposed in the second area A2.

Referring to FIG. 14, according to the selective overdriving algorithm according to embodiments described herein, for a sub-pixel SP located closer to the source driver integrated circuit SDIC, the application of the overdriving may not be beneficial (or in some cases required), or the application of the overdriving with a small intensity may be beneficial. For a sub-pixel SP located farther away from the source driver integrated circuit SDIC, the application of the overdriving may be beneficial (or in some cases required), or the application of the overdriving with a great intensity may be beneficial.

Referring to FIG. 14, among the first to third sub-pixels SP1 to SP3, the third sub-pixel SP3 disposed in the third area A3 is located farthest away from the source driver integrated circuits SDIC. That is, among the first to third sub-pixels SP1 to SP3, the third sub-pixel SP3 is located farther away from the data driving circuit 120 than the second sub-pixel SP2.

Referring to FIG. 14, since the first sub-pixel SP1 is located closest to the source driver integrated circuit SDIC among the first to third sub-pixels SP1 to SP3, therefore, a lack of charge is least likely to occur. Accordingly, among the first to third sub-pixels SP1 to SP3, the first sub-pixel SP1 closest to the source driver integrated circuit SDIC can receive a non-overdriven first data signal Vdata1.

Referring to FIG. 14, among the first to third sub-pixels SP1 to SP3, the second sub-pixel SP2 can receive an overdriven second data signal Vdata2, and the third sub-pixel SP3 can receive an overdriven third data signal Vdata3.

Referring to FIG. 14, the overdriven second data signal Vdata2 supplied to the second sub-pixel SP2 may include a voltage duration or level in which a second overdriving voltage VPOD2 is added to an original data voltage Vimg, and the overdriven third data signal Vdata3 supplied to the third sub-pixel SP3 may include a voltage duration or level in which a third overdriving voltage VPOD3 is added to an original data voltage Vimg.

Since the third sub-pixel SP3 is located farther away from the source driver integrated circuit SDIC than the second sub-pixel SP2, a lack of charge is more likely to occur.

Thus, the overdriven third data signal Vdata3 supplied to the third sub-pixel SP3 may be a signal overdriven with a higher intensity than the overdriven second data signal Vdata2 supplied to the second sub-pixel SP2. Accordingly, the third overdriving voltage VPOD3 may be higher than the second overdriving voltage VPOD2.

Referring to FIG. 15, in the case of the first sub-pixel SP1 disposed in the first area A1, even though overdriving is not performed, since the first data signal Vdata1 may be relatively quickly supplied to the first sub-pixel SP1 disposed in the first area A1 due to a relatively short transmission path of the first data signal Vdata1, a charging time of the first sub-pixel SP1 disposed in the first area A1 may not be insufficient.

Thus, in the case of the first sub-pixels SP disposed in the first area A1 located closest to the source driver integrated circuit SDIC, even though overdriving is not performed, normal luminance corresponding to a voltage signal from the gamma circuitry can be represented because a lack of charge may not occur.

Referring to FIG. 15, in the case of the second sub-pixel SP2 disposed in the second area A2, since the second data signal Vdata2 may be relatively slowly supplied to the second sub-pixel SP2 disposed in the second area A2 due to a relatively long transmission path of the second data signal Vdata2, a charging time of the second sub-pixel SP2 disposed in the second area A2 may become insufficient.

However, as the overdriven second data signal Vdata2 is supplied to the second sub-pixel SP2 disposed in the second area A2, the second sub-pixel SP2 can be compensated for such a lack of charge. Accordingly, the second sub-pixel SP2 disposed in the second area A2 can represent a normal luminance corresponding to a voltage signal from the gamma circuitry.

Referring to FIG. 15, in the case of the third sub-pixel SP3 disposed in the third area A3, since the third data signal Vdata3 may be relatively very slowly supplied to the third sub-pixel SP3 disposed in the third area A3 due to a relatively very long transmission path of the third data signal Vdata3, a charging time of the third sub-pixel SP3 disposed in the third area A3 may become considerably insufficient.

However, as the overdriven third data signal Vdata3 with a high intensity is supplied to the third sub-pixel SP3 disposed in the third area A3, the third sub-pixel SP2 can be compensated for such a lack of charge. Accordingly, the third sub-pixel SP3 disposed in the third area A3 may represent a normal luminance corresponding to a voltage signal from the gamma circuitry.

Figure 16:
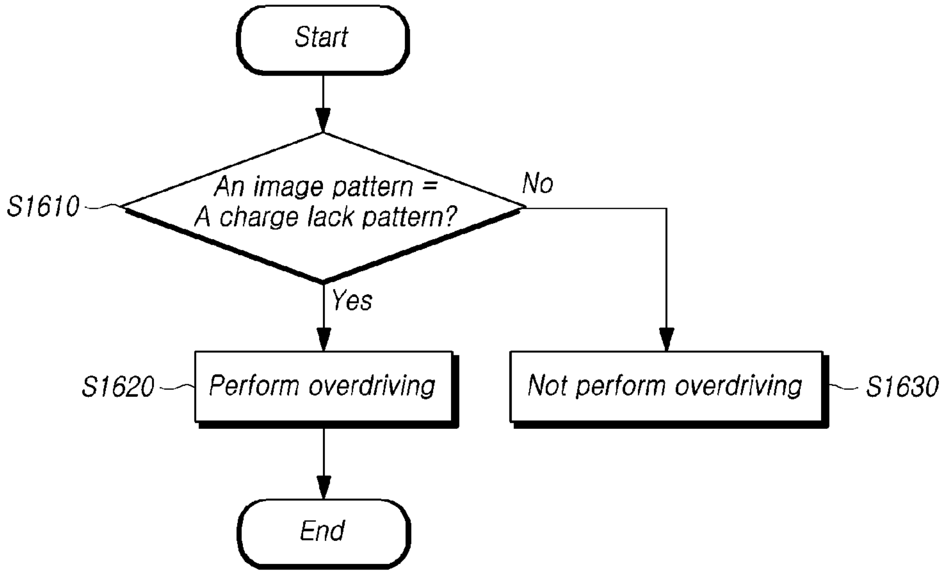
FIG. 16 is a flow chart illustrating a display driving method in an embodiment according to aspects of the present disclosure.

FIG. 16 is a flow chart illustrating a display driving method of the display device 100 according to aspects of the present disclosure.

Referring to FIG. 16, the display driving method of the display device 100 according to aspects of the present disclosure includes, with a controller 140, determining whether a pattern of an image to be displayed on a display panel is a charge lack pattern defined in advance, at step S1610, when it is determined that the image pattern is the charge lack pattern, with a data driving circuit 120, outputting an overdriven data signal obtained by overdriving a data signal Vdata, at step S1620, and when it is determined that the image pattern is not the charge lack pattern, with the data driving circuit 120, outputting the data signal without being overdriven, at step S1630 etc.

In step S1610, when the image pattern is a monochromatic still image pattern having a luminance value greater than or equal to a predetermined or selected luminance value, the controller 140 can determine that the image pattern is not the charge lack pattern.

In step S1610, when the image pattern is a pattern in which a voltage level of the data signal Vdata for displaying the image does not swing over time (the passage of time), the controller 140 can determine that the image pattern is not the charge lack pattern.

Figure 17:
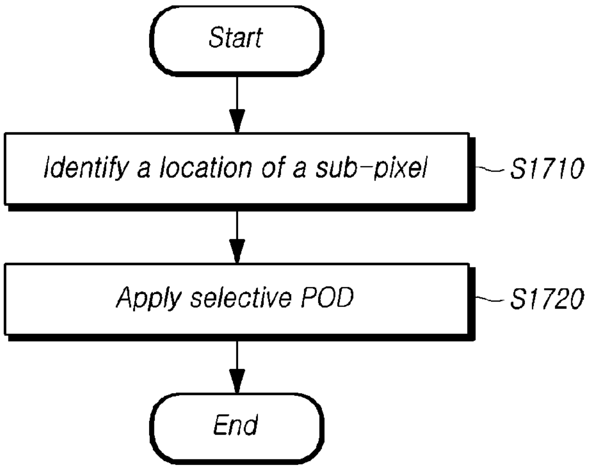
FIG. 17 is a flow chart illustrating a display driving method in another embodiment according to aspects of the present disclosure.

FIG. 17 is a flow diagram illustrating a display driving method of the display device 100 according to aspects of the present disclosure.

Referring to FIG. 17, in the display driving method of the display device 100 according to aspects of the present disclosure includes, with a controller 140, identifying a location of a sub-pixel SP to which data are supplied among a plurality of sub-pixel SP, at step S1710, and performing selective pixel overdriving based on the identified location of the sub-pixel SP, at step S1720.

In step S1720, depending on the identified location of the sub-pixel SP, the data driving circuit 120 can output an overdriven data signal Vdata or a none-overdriven data signal Vdata.

When the controller 140 determines that the sub-pixel SP to which the data are supplied is disposed in an area (first area A1) close to, e.g., within a certain distance from, data driving circuit 120 in step S1710, the data driving circuit 120 can output the none-overdriven data signal Vdata in step S1720.

Referring to FIGS. 14 and 15, the plurality of sub-pixels SP includes a first sub-pixel SP1 and a second sub-pixel SP2, and the first sub-pixel SP1 may be located closer to the data driving circuit 120 than the second sub-pixel SP2. In this situation, in step S1720, the first sub-pixel SP1 can receive a non-overdriven first data signal Vdata1, and the second sub-pixel SP2 can receive an overdriven second data signal Vdata2.

Referring to FIGS. 14 and 15, the plurality of sub-pixels SP may further include a third sub-pixel SP3, and the third sub-pixel SP3 may be located farther away from the data driving circuit 120 than the second sub-pixel SP2. In this situation, the third sub-pixel SP3 can receive an overdriven third data signal Vdata3.

The overdriven second data signal Vdata2 supplied to the second sub-pixel SP2 may include a voltage duration or level in which a second overdriving voltage VPOD2 is added to an original data voltage Vimg.

The overdriven third data signal Vdata3 supplied to the third sub-pixel SP3 may include a voltage duration or level in which a third overdriving voltage VPOD3 is added to an original data voltage Vimg. The third overdriving voltage VPOD3 may be greater than the second overdriving voltage VPOD2.

According to the embodiments described above, it is possible to provide the display devices 100, the controllers 120, and the display driving methods capable of compensating for the lack of the amount of charge in sub-pixels.

According to the embodiments described above, it is possible to the display devices 100, the controllers 120, and the display driving methods capable of selectively overdriving only an image pattern or sub-pixel regarded as a more likely lack of charge.

According to the embodiments described above, it is possible to the display devices 100, the controllers 120, and the display driving methods capable of preventing excessive compensation caused by unnecessary overdriving by selectively performing overdriving for an image pattern regarded as a more likely lack of charge and not performing the overdriving for an image pattern regarded as a less likely lack of charge.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of sub-pixels electrically connected to a plurality of data lines and a plurality of gate lines;

a data driving circuit configured to output a data signal to at least one of the plurality of data lines for displaying images on the display panel;

a controller configured to control the data driving circuit and supply data to the data driving circuit;

a power management integrated circuit configured to output a source driving voltage, which is an operation voltage of the data driving circuit, to the data driving circuit; and a feedback line configured to feed back the source driving voltage supplied to the data driving circuit to the controller, wherein the data driving circuit is configured to output a first data signal based on a pattern of an image as the data signal and a second data signal based on a distance of a sub-pixel from the data driving circuit to which the data signal is supplied as the data signal, wherein the second data signal is overdriven compared to the first data signal, and wherein the controller:

determines whether the pattern of the image displayed on the display panel is a charge lack pattern defined in advance based on the fed-back source driving voltage, and outputs information on whether overdriving is determined to be required or information on an overdriving level based on a result of determining that the pattern is a charge lack pattern.

2. The display device according to claim 1, wherein when the pattern of the image is a monochromatic still image pattern displayed with data voltages equal to or greater than a threshold data voltage value, the data driving circuit outputs the first data signal.

3. The display device according to claim 1, wherein when the pattern of the image is a pattern in which a voltage level of the data signal for displaying the image does not swing, the data driving circuit outputs the first data signal.

4. The display device according to claim 1, wherein the second data signal includes a voltage duration or level in which an overdriving voltage is added to an original data voltage, and the overdriving voltage varies based on the pattern of the image or varies based on a location of the sub-pixel to which the original data voltage is supplied.

5. The display device according to claim 1, wherein the plurality of sub-pixels includes a first sub-pixel and a second sub-pixel, and the first sub-pixel is located closer to the data driving circuit than the second sub-pixel, and wherein the first sub-pixel receives the first data signal, and the second sub-pixel receives the second data signal.

6. The display device according to claim 5, wherein the plurality of sub-pixels further includes a third sub-pixel located farther away from the data driving circuit than the second sub-pixel, and the third sub-pixel receives a third data signal, wherein the second data signal supplied to the second sub-pixel includes a voltage duration or level in which a second overdriving voltage is added to an original data voltage, and the third data signal supplied to the third sub-pixel includes a voltage duration or level in which a third overdriving voltage is added to an original data voltage, and wherein the third overdriving voltage is greater than the second overdriving voltage.

7. The display device according to claim 1, further comprising a register for storing information on the pattern of the image for which the first data signal is output or storing information on the pattern of the image for which the second data signal.

8. The display device according to claim 1, wherein the controller determines whether the pattern of the image displayed on the display panel is a charge lack pattern defined in advance based on a monitoring result for a current resulting from an output of the source driving voltage from the power management integrated circuit.

9. The display device according to claim 1, further comprising:

a controller power block for supplying a current to the controller; and a current sensor for sensing the current supplied to the controller from the controller power block, wherein the controller determines whether the pattern of the image displayed on the display panel is a charge lack pattern defined in advance based on a result of the sensing of the current sensor.

10. A controller comprising:

a data supply circuit configured to supply data for an image displayed on a display panel; and a selective pixel overdriving controller to which the data are supplied, the selective pixel overdriving controller configured to cause a first data based on a pattern of the image and a second data based on a distance of a sub-pixel, to be output by a data driving circuit including at least one source driver integrated circuit, wherein the second data is supplied to a second sub-pixel disposed farther away from the data driving circuit than a first sub-pixel to which the first data is supplied and is an overdriven data, and the first data is a data overdriven with an intensity smaller than the second data, wherein the selective pixel overdriving controller:

determines whether the pattern of the image displayed on the display panel is a charge lack pattern defined in advance based on a fed-back source driving voltage, and outputs information on whether overdriving is determined to be required or information on an overdriving level based on a result of determining whether the pattern is a charge lack pattern or not, wherein the fed-back source driving voltage is supplied from the data driving circuit to the selective pixel overdriving controller via a feedback line electrically connected between the data driving circuit to the selective pixel overdriving controller.

11. The controller according to claim 10, wherein when the pattern of the image is a monochromatic still image pattern displayed with data voltages equal to or greater than a threshold data voltage value, the selective pixel overdriving controller outputs a control signal for causing the overdriving not to be performed or cause the first data to be output.

12. The controller according to claim 10, wherein when the pattern of the image is a pattern in which a voltage level of a data signal for displaying the image does not swing, the selective pixel overdriving controller outputs a control signal for causing the overdriving not to be performed or cause the first data to be output.

13. A display driving method of a display device including a display panel including a plurality of sub-pixels, a data driving circuit electrically connected to the display panel, and a controller configured to control the data driving circuit and supply data to the data driving circuit, the display driving method comprising:

identifying a location of a sub-pixel to which data are supplied among the plurality of sub-pixels;

outputting a source driving voltage, which is an operation voltage of the data driving circuit, to the data driving circuit;

feeding back the source driving voltage supplied to the data driving circuit to the controller;

outputting a first data signal based on a pattern of an image and a second data signal based on a distance of a sub-pixel from the data driving circuit, the second data signal being overdriven compared to the first data signal;

determining whether the pattern of the image displayed on the display panel is a charge lack pattern defined in advance based on the fed-back source driving voltage, and outputting information on whether overdriving is determined to be required or information on an overdriving level based on a result of determining that the pattern is a charge lack pattern.

14. The display driving method according to claim 13, wherein when it is identified that the sub-pixel to which the data are supplied is disposed in an area close to, or within a certain distance from, data driving circuit, the first data signal.

15. The display driving method according to claim 13, wherein the plurality of sub-pixels includes a first sub-pixel and a second sub-pixel, and the first sub-pixel is located closer to the data driving circuit than the second sub-pixel, and wherein the first sub-pixel receives the first data signal, and the second sub-pixel receives the second data signal.

16. The display driving method according to claim 15, wherein the plurality of sub-pixels further includes a third sub-pixel located farther away from the data driving circuit than the second sub-pixel, and the third sub-pixel receives a third data signal, wherein the second data signal supplied to the second sub-pixel includes a voltage duration or level in which a second overdriving voltage is added to an original data voltage, and the third data signal supplied to the third sub-pixel includes a voltage duration or level in which a third overdriving voltage is added to an original data voltage, and wherein the third overdriving voltage is greater than the second overdriving voltage.

* * * * *